(12) United States Patent
Mori et al.

(10) Patent No.: US 11,709,176 B2
(45) Date of Patent: Jul. 25, 2023

(54) ROTATION OPERATION DETECTION MECHANISM AND ROTATION OPERATION DETECTION METHOD

(71) Applicant: Murata Manufacturing Co., Ltd., Nagaokakyo (JP)

(72) Inventors: Kenichi Mori, Nagaokakyo (JP); Masamichi Ando, Nagaokakyo (JP); Hiroo Yamakawa, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 168 days.

(21) Appl. No.: 16/879,048

(22) Filed: May 20, 2020

(65) Prior Publication Data

US 2020/0278375 A1 Sep. 3, 2020

Related U.S. Application Data

(63) Continuation of application No. PCT/JP2019/042517, filed on Oct. 30, 2019.

(30) Foreign Application Priority Data

Nov. 13, 2018 (JP) .................................. 2018-212638
Feb. 21, 2019 (JP) .................................. 2019-029027

(51) Int. Cl.
  *G01L 1/16* (2006.01)
  *G01P 13/04* (2006.01)

(52) U.S. Cl.
  CPC ................ *G01P 13/04* (2013.01); *G01L 1/16* (2013.01)

(58) Field of Classification Search
  CPC ....... G01P 13/04; G01L 1/16; G02B 27/0176; H05K 9/00; G11B 31/00; G05G 1/04; G06F 3/0224
  USPC ....................................................... 73/862.625
  See application file for complete search history.

(56) References Cited

U.S. PATENT DOCUMENTS

| | | | |
|---|---|---|---|
| 9,836,141 B2* | 12/2017 | Kim | G06F 3/0362 |
| 10,378,973 B2 | 8/2019 | Kihara et al. | |
| 10,447,262 B2* | 10/2019 | Bach | H03K 17/97 |
| 2014/0020458 A1 | 1/2014 | Schophuis | |
| 2015/0168237 A1 | 6/2015 | Tajitsu et al. | |
| 2017/0052617 A1* | 2/2017 | Okuzumi | G06F 3/0362 |
| 2017/0074685 A1* | 3/2017 | Tang-Kong | G01D 5/2415 |
| 2017/0176268 A1 | 6/2017 | Kihara et al. | |

FOREIGN PATENT DOCUMENTS

| | | |
|---|---|---|
| CN | 103592463 A | 2/2014 |
| CN | 104321613 A | 1/2015 |
| CN | 105390320 A | 3/2016 |

(Continued)

OTHER PUBLICATIONS

International Search Report Issued for PCT/JP2019/042517, dated Jan. 28, 2020.

(Continued)

*Primary Examiner* — Octavia Davis Hollington
(74) *Attorney, Agent, or Firm* — ArentFox Schiff LLP

(57) ABSTRACT

A rotation operation detection mechanism that includes a housing, an operation surface disposed on a first main surface of the housing, operation units formed integrally with the housing and protruding on the operation surface side, and a sensor that detects a stress generated in the housing when the operation units are rotated.

20 Claims, 24 Drawing Sheets

(56) References Cited

FOREIGN PATENT DOCUMENTS

| | | | | |
|---|---|---|---|---|
| CN | 107003749 | * | 8/2017 | |
| CN | 107003749 A | * | 8/2017 | ............... G05G 1/08 |
| JP | H06224009 A | | 8/1994 | |
| JP | H08066882 A | | 3/1996 | |
| JP | 2007172977 | * | 7/2007 | |
| JP | 2014019355 A | | 2/2014 | |
| JP | 2014116166 | * | 6/2014 | |
| WO | 2016038951 A1 | | 3/2016 | |
| WO | WO-2016170908 A1 | * | 10/2016 | ............. G06F 3/023 |

OTHER PUBLICATIONS

Written Opinion of the International Searching Authority issued for PCT/JP2019/042517, dated Jan. 28, 2020.
Chinese Office Action issued for CN Patent Application No. 201980035363.X, dated Nov. 26, 2021.

* cited by examiner

FIG. 15(A)
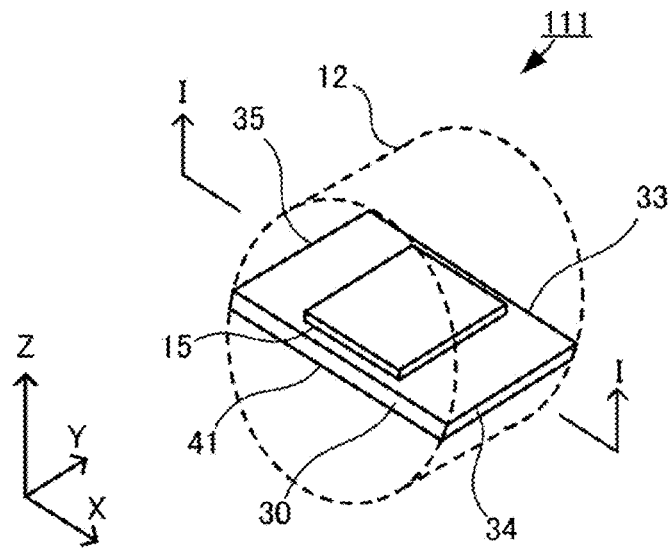
FIG. 15(B)
FIG. 15(C)
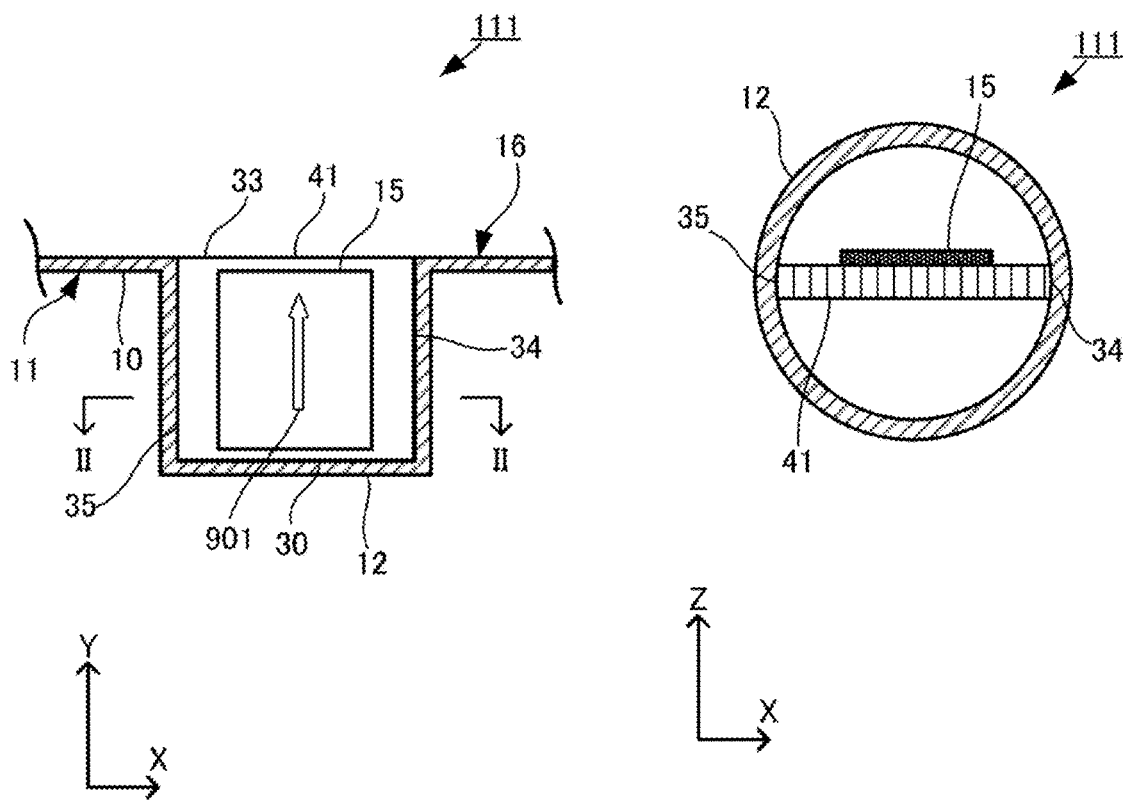

ROTATION OPERATION DETECTION MECHANISM AND ROTATION OPERATION DETECTION METHOD

CROSS REFERENCE TO RELATED APPLICATIONS

This application is a continuation of International Patent Application No. PCT/JP2019/042517 filed on Oct. 30, 2019, which claims priority to Japanese Patent Application No. 2019-029027, filed on Feb. 21, 2019, and to Japanese Patent Application No. 2018-212638, filed on Nov. 13, 2018, the contents of each of which are incorporated herein by reference.

TECHNICAL FIELD

The present invention relates to a rotation operation detection mechanism and a rotation operation detection method for detecting rotation operation.

BACKGROUND

Patent Document 1 (identified below) discloses a waterproof structure including an outer knob and a mounting surface for the outer knob. An O-ring is fitted as a first waterproof material between the outer knob and the mounting surface of the outer knob. Further, an O-ring is fitted as a second waterproof material between the outer knob and an inner knob.

Patent Document 1: Japanese Patent Application Laid-Open No. 6-224009.

In the waterproof structure of a knob portion described in Patent Document 1, the outer knob and the inner knob slide with respect to a housing. Parts such as the O-ring rub against each other due to sliding of the outer knob and the inner knob, and friction occurs between the parts. If the outer knob and the inner knob are repeatedly operated, the parts may be deteriorated due to friction.

SUMMARY OF THE INVENTION

In view of the foregoing, it is an object of the exemplary embodiments to provide a rotation operation detection mechanism and a rotation operation detection method for detecting rotation operation, in which sliding portions are reduced.

A rotation operation detection mechanism according to an exemplary embodiment includes a housing, an operation surface disposed on a first main surface of the housing, an operation unit formed integrally with the housing and protruding toward the operation surface side, and a sensor that detects a stress generated on the housing when the operation unit is rotated.

In this configuration, the operation unit is formed integrally with the housing. When the user rotates the operation unit, the number of locations where parts rub against each other are reduced. In this configuration, since there are few locations where the operation unit slides with respect to the housing, deterioration in the parts is suppressed.

Moreover, a rotation operation detection method according to an exemplary embodiment includes determining that any one of a plurality of sensors, which are formed integrally with a housing, are disposed, one for each section of an operation unit divided into three or more sections, and detect a stress generated in the operation unit when the operation unit is rotated, outputs a signal of a peak of an intensity equal to or more than a predetermined threshold; storing, as a first time, a time at which a signal of the one sensor is determined to become a reference value after a signal with a peak of an intensity equal to or more than the predetermined threshold is determined to be output; storing, as a second time, a time at which any one of the plurality of sensors is determined to output a signal with a peak having an intensity equal to or more than the predetermined threshold for first time after the first time; storing, as a third time, a time at which any one of the plurality of sensors is determined to output a signal with a peak having an intensity equal to or more than the predetermined threshold and of same polarity as a peak output at the second time for first time after the second time; and determining that the operation unit receives rotation operation when signals of all the plurality of sensors are determined to exceed the predetermined threshold during a period from the first time to the third time.

With this configuration, whether or not the user rotates the operation unit can be determined based on the magnitude of an output from a plurality of sensors that detect a stress generated in the operation unit and a detection time.

According to the exemplary embodiments of the present disclosure, a rotation operation detection mechanism and a rotation operation detection method are provided that detect rotation operation with few sliding portions can be provided.

BRIEF DESCRIPTION OF DRAWINGS

FIGS. 15(A) to 15(C) are diagrams for explaining the rotation operation detection mechanism according to an eleventh embodiment.

DETAILED DESCRIPTION

Hereinafter, a rotation operation detection mechanism and a rotation operation detection method according to an exemplary embodiment will be described with reference to the drawings. It is noted that, in each of the drawings, wirings and the like are omitted for convenience of explanation.

Figure 1A:
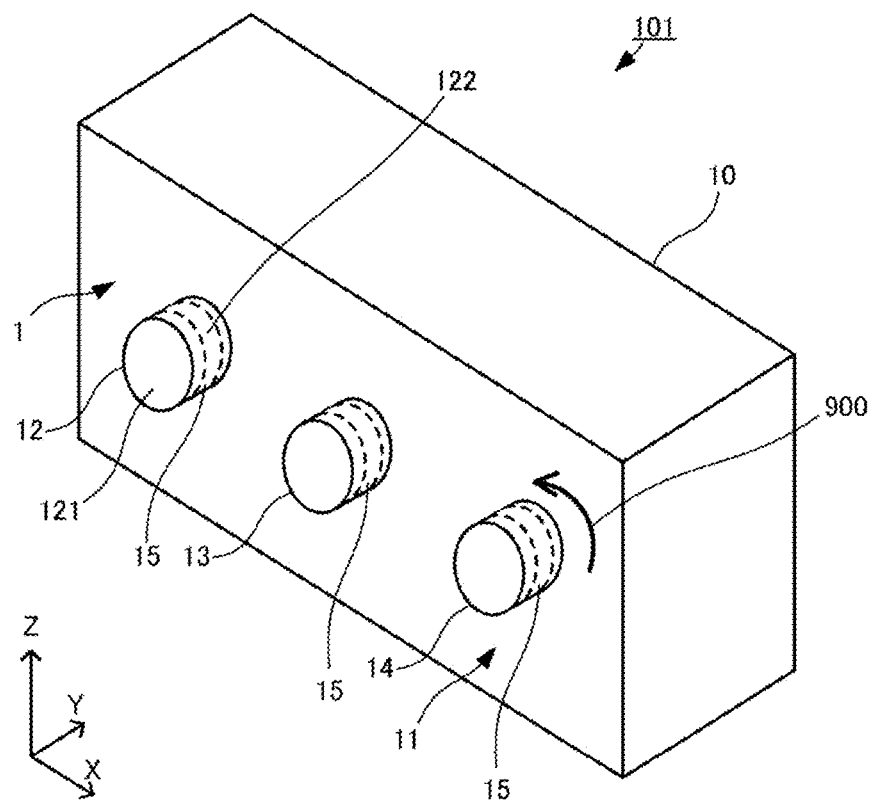
FIG. 1(A) is a perspective view of a rotation operation detection mechanism according to a first embodiment.
Figure 1B:
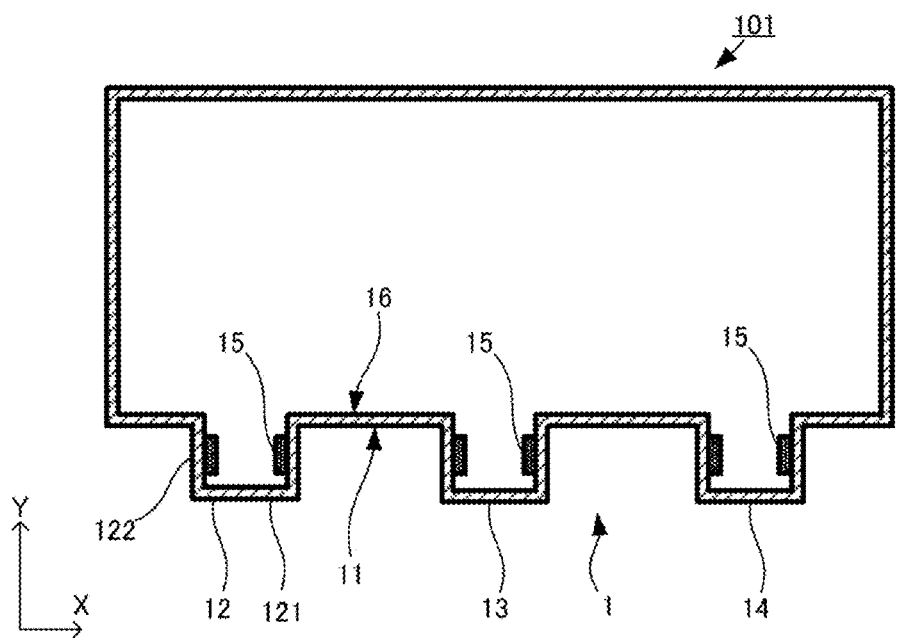
FIG. 1(B) is a cross-sectional view of the rotation operation detection mechanism shown in FIG. 1(A).

FIG. 1(A) is a perspective view of a rotation operation detection mechanism 101 according to a first embodiment. FIG. 1(B) is a cross-sectional view when the rotation operation detection mechanism 101 is cut along an X-Y plane. It is noted that the rotation operation detection mechanism 101 shown in FIGS. 1(A) and 1(B) is merely an example of the present invention, and the present invention is not limited to this configuration and can have a shape and the like appropriately changed according to specifications. Further, in FIG. 1(A), for convenience of explanation, a sensor inside a housing is shown by a broken line through the housing.

Hereinafter, in other drawings as well, there is a case where the sensor inside the housing is shown by a broken line through the housing.

As shown in FIGS. 1(A) and 1(B), the rotation operation detection mechanism 101 includes a substantially rectangular parallelepiped housing 10. The housing 10 has an operation surface 11 on a first main surface 1 of the housing 10. An operation unit 12, an operation unit 13, and an operation unit 14 are formed integrally with the housing 10, and are formed to protrude from the housing 10 on the operation surface 11 side. Since the operation unit 12, the operation unit 13, and the operation unit 14 have similar configurations, the operation unit 12 will be described below as a representative. Hereinafter, the rotation operation detection mechanism 101 will be described with a width direction (lateral direction) of the housing 10 as an X direction, a thickness direction as a Y direction, and a length direction (vertical direction) as a Z direction. It is noted that these directions are relative to each other based on the orientation of the rotation operation detection mechanism 101.

In an exemplary aspect, the housing 10 is made from a metal material, for example, aluminum, an aluminum alloy, stainless steel, or the like can be used. The operation unit 12 is formed by pressing the operation surface 11 side of the housing 10. Note that the housing 10 and the operation unit 12 may be formed by integrally injection-molding resin or the like. Further, the housing 10 and the operation unit 12 may be made from another material as long as a shear stress is generated by rotation operation.

The operation unit 12 is formed continuously with the housing 10. For this reason, the operation unit 12 hardly slides or does not slide with respect to the housing 10. Furthermore, in a case where there is no gap between the operation unit 12 and the housing 10, the internal space of the housing 10 is kept watertight from the outside. Further, at least the operation surface 11 is preferably formed continuously. Note that the material and shape of the housing 10 are not limited to metal and resin, and may be any as long as the housing 10 is deformed at least slightly when a force is applied.

The operation unit 12 has a columnar shape, and protrudes from the housing 10 on the operation surface 11 side. For this reason, the user can grip a side surface 122 of the operation unit 12 and apply a force in a direction in which the operation unit 12 rotates on an X-Z plane. Note that the operation unit 12 is not limited to a columnar shape, and may be, for example, a rectangular parallelepiped, a polygonal column such as a hexagonal column, or have a structure in which a protrusion exists on part of the circumference according to alternative aspects.

The operation unit 12 is formed in a hollow shape. Moreover, a sensor 15 is disposed on a back side 16 of the operation surface 11 in the operation unit 12. Since the sensor 15 is not directly in contact with the user's hand, durability of the sensor 15 improves.

The sensor 15 is disposed along a circumferential direction of the operation unit 12. The sensor 15 is attached to the operation unit 12 with, for example, an adhesive, a pressure sensitive adhesive, or the like. As will be described in detail below, the sensor 15 detects a stress generated on the housing 10 when the operation unit 12 is rotated.

When the user applies a force in a direction in which the operation unit 12 rotates on the X-Z plane, that is, in the circumferential direction of the operation unit 12, the sensor 15 can detect deformation of the housing 10. As shown, the sensor 15 is disposed along and around the side surface 122 of the operation unit 12. When a thickness of the operation unit 12 is small, the operation unit 12 is easily deformed by a force applied by the user. In this manner, a force applied by the user is transmitted to the sensor 15 disposed on an inner side of the operation unit 12.

It is noted that although the sensor 15 is disposed along and around the side surface 122 of the operation unit 12, the configuration is not limited to this. The sensor 15 may be disposed, for example, only on part along the side surface 122 of the operation unit 12, or may be disposed spirally on the side surface 122 of the operation unit 12 in one or more circumferences of the operation unit 12.

Figure 2A:
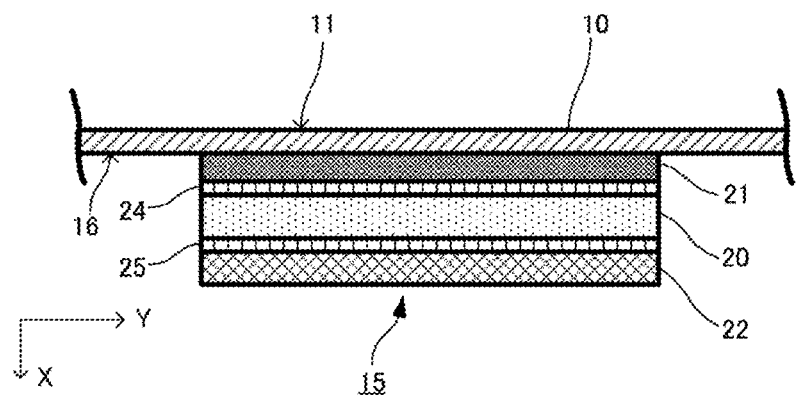
FIG. 2(A) is an enlarged cross-sectional view of a sensor shown in FIG. 1(B)
Figure 2B:
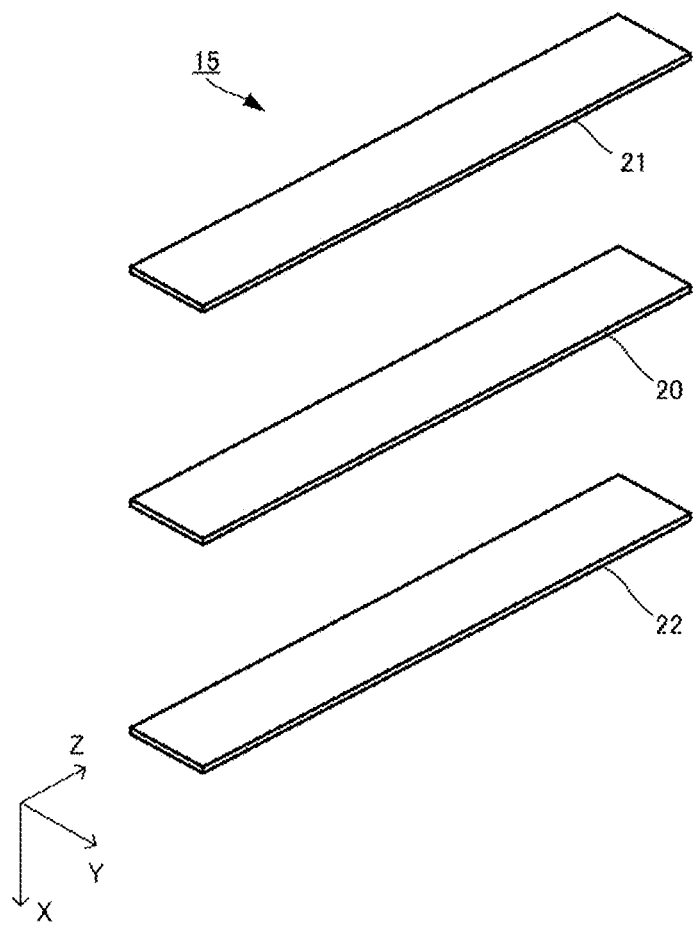
FIG. 2(B) is an exploded perspective view of the sensor according to the first embodiment.

FIG. 2(A) is an enlarged cross-sectional view of the sensor 15 shown in FIG. 1(B) cut along an X-Y plane, and FIG. 2(B) is an exploded perspective view of the sensor 15. Note that FIGS. 2(A) and 2(B) are schematic diagrams, and for convenience of explanation, the thickness and the like of each part of the sensor 15 are shown large, and a processing unit, a wiring, and the like are omitted. Further, FIG. 2(B) is a diagram in which the sensor 15 is extended so as to be parallel to the Y-Z plane.

As shown in FIGS. 2(A) and 2(B), the sensor 15 includes a piezoelectric film 20, a first electrode 21, and a second electrode 22. Each of the piezoelectric film 20, the first electrode 21, and the second electrode 22 has a flat (i.e., planar) film shape. The first electrode 21 and the second electrode 22 are stacked so as to sandwich the piezoelectric film 20, and are bonded by a first adhesive layer 24 and a second adhesive layer 25, respectively. The first electrode 21 is a signal electrode, and the second electrode 22 is a ground electrode. It is also noted that the second electrode 22 may be a signal electrode, and the first electrode 21 may be a ground electrode in an alternative arrangement. Further, in FIG. 2(B), the illustration of the first adhesive layer 24 and the second adhesive layer 25 is omitted.

The piezoelectric film 20, the first electrode 21, and the second electrode 22 are each formed in a rectangular shape in plan view. When the sensor 15 is viewed in plan view from an X-axis direction, the first electrode 21 and the second electrode 22 preferably completely overlap with the piezoelectric film 20 in top view or are preferably positioned on an inner side of the piezoelectric film 20 in a plane direction. In this manner, a short circuit at an end portion of the first electrode 21 and the second electrode 22 can be suppressed.

Figure 3:
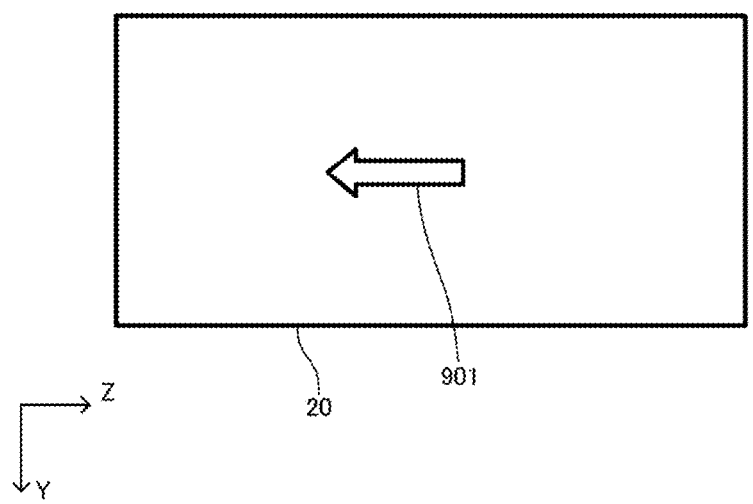
FIG. 3 is a partially enlarged view for explaining a piezoelectric film according to the first embodiment.

FIG. 3 is a partially enlarged view for explaining the piezoelectric film 20. The piezoelectric film 20 may be a film formed from a chiral polymer. As the chiral polymer, polylactic acid (PLA), particularly poly-L-lactic acid (PLLA), is used in the first embodiment. In the PLLA including a chiral polymer, a main chain has a helical structure. PLLA has piezoelectricity when uniaxially stretched and a molecule is oriented. Then, the uniaxially stretched PLLA is charged when a flat plate surface of the piezoelectric film 20 is extended.

In the first embodiment, a uniaxial stretching direction of the piezoelectric film 20 (PLLA) is a direction parallel to the Z direction which is a long side direction, as indicated by an arrow 901 in FIG. 3. This parallel direction includes, for example, an angle including about ±10 degrees. When the piezoelectric film 20 is extended, for example, in a direction of 45 degrees with respect to the Z direction, charges are generated. At this time, an amount of the generated charges depends on an amount of extension and a direction of extension. The piezoelectric film 20 generates a largest amount of charges when stretched in a direction of 45 degrees with respect to the uniaxial stretching direction of the piezoelectric film 20, and does not generate an amount of charges when stretched in the same direction as the uniaxial stretching direction. It is also noted that the uniaxial stretching direction of the piezoelectric film 20 may be a direction parallel to a short side direction.

In PLLA, piezoelectricity is generated by orientation treatment of molecules by stretching or the like, and there is no need to perform poling treatment like other polymers such as PVDF and piezoelectric ceramics. That is, piezoelectricity of PLLA not belonging to a ferroelectric is not expressed by polarization of an ion like a ferroelectric, such as PVDF or PZT, but is derived from a helical structure which is a characteristic structure of a molecule. For this reason, pyroelectricity that is generated in other ferroelectric piezoelectric materials is not generated in the PLLA. The sensor 15, which does not have pyroelectricity and is not affected by a temperature of a finger of the user or frictional heat, can be formed to be thin. Furthermore, a change in a piezoelectric constant is observed over time in PVDF or the like, and in some cases, a piezoelectric constant may decrease significantly; however, a piezoelectric constant of PLLA is extremely stable over time. Accordingly, extension of the piezoelectric film 20 can be detected at high sensitivity without any influence from an ambient environment.

As the first electrode 21 and the second electrode 22 formed on both main surfaces of the piezoelectric film 20, an electrode based on meatal, such as aluminum and copper, can be used. Further, when the electrode is required to have transparency, the first electrode 21 and the second electrode 22 can be made from a highly transparent material such as ITO or PEDOT. By providing the first electrode 21 and the second electrode 22, a charge generated by the piezoelectric film 20 is output to a processing unit (not shown), and is converted into a voltage in a circuit of the processing unit, so that a detected voltage value corresponding to an amount of extension is detected. When the housing 10 is deformed, the sensor 15 outputs a charge corresponding to the deformation of the housing 10 to the processing unit (not shown).

Hereinafter, detection of a voltage value of the sensor 15 when the user operates the operation unit 12 of the rotation operation detection mechanism 101 will be described in detail.

Figure 4A:
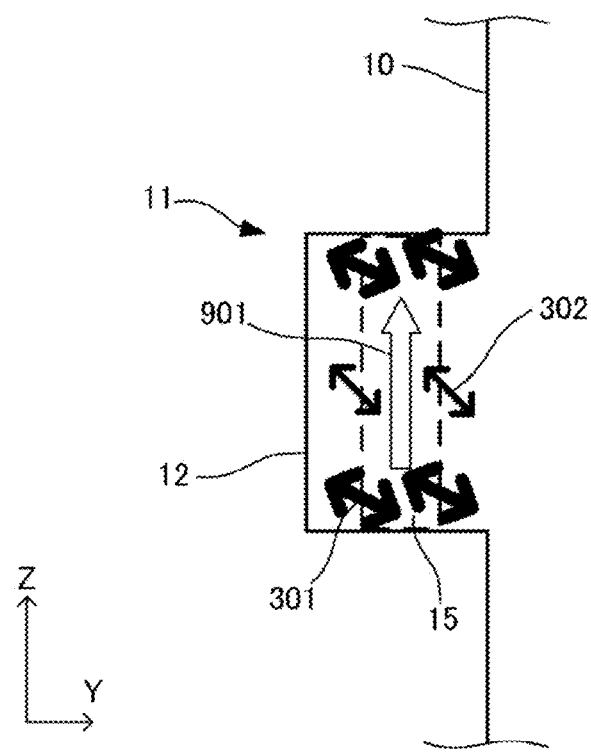
FIG. 4(A) is a diagram schematically showing a shear stress generated in a case where the user operates the rotation operation detection mechanism according to the first embodiment.
Figure 4B:
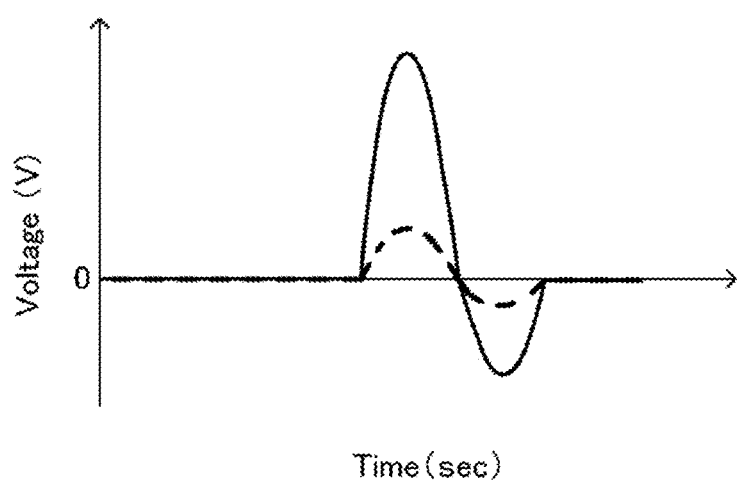
FIG. 4(B) is a diagram showing an output value of the sensor in a case where the user operates to rotate an operation unit or in a case where the user grips the operation unit.

FIG. 4(A) is a diagram schematically showing a shear stress generated when the user operates to rotate the operation unit 12 of the rotation operation detection mechanism 101, and is a side view when the operation unit 12 is viewed from the X direction to a −X direction. FIG. 4(B) is a diagram showing an output value of the sensor 15 when the user operates to rotate the operation unit 12 or when the user grips the operation unit 12.

When the user rotates the operation unit 12, that is, a case where the user grips the operation unit 12 and applies a force in a direction in which the operation unit 12 rotates on the X-Z plane will be described. For example, assume a case where the user rotates the operation unit 12 counterclockwise as indicated by arrow 900 in FIG. 1(A).

As shown in FIG. 4(A), a shear stress as indicated by arrows 301 and 302 is generated on a side surface of the operation unit 12. The shear stress is generated to be in a direction mainly at 45 degrees with respect to a circumferential direction of the operation unit 12. The shear stress is generated to be in a direction mainly at 45 degrees with respect to the uniaxial stretching direction (arrow 901) of the piezoelectric film 20. That is, the piezoelectric film 20 is disposed so that each shear stress (arrows 301 and 302) generated on the operation surface 11 when the operation unit 12 receives rotation operation is along a direction in which the sensor 15 detects the extension of the piezoelectric film 20. Here, that the direction in which the extension of the piezoelectric film 20 is detected is along the shear stress means that the direction in which the extension of the piezoelectric film 20 is detected and the direction of the shear stress preferably form an angle of parallel ±10°. Therefore, the sensor 15 outputs a voltage value according to the shear stress. It is also noted that arrows 301 and 302 represent particularly large ones of the shear stresses generated on the operation surface 11. Shear stresses shown in a diagram described below also represent some particularly large ones of the shear stresses generated on the operation surface 11 similarly to FIG. 4(A).

In FIG. 4(A), the shear stress indicated by arrow 302 near the center in a vertical direction of the operation unit 12 mainly forms a direction of 45 degrees with respect to the uniaxial stretching direction (arrow 901). An inclination with respect to the Z direction of the shear stress indicated by arrow 301 is shown to be larger than that of the shear stress indicated by arrow 302. This is because the piezoelectric film 20 is curved with respect to the X-axis direction, and the degree of the curving is greater on upper and lower sides in the Z-axis direction with arrow 301 than on the center with arrow 302.

Further, the shear stress indicated by arrow 301 mainly forms a direction of 45 degrees with respect to the uniaxial stretching direction (i.e., arrow 901) of the piezoelectric film 20 that is curved with respect to the X-axis direction. Here, the thickness of arrows 301 and 302 indicates an amount of charges generated from the piezoelectric film 20. The shear stress indicated by arrow 301 is shown to be larger than the shear stress indicated by arrow 302, because the piezoelectric film 20 is curved with respect to the X-axis direction, and a large number of shear stresses overlap in the X-axis direction. In actuality, the shear stress is uniformly generated in the circumferential direction of the operation unit 12.

Due to the deformation of the operation unit 12, the piezoelectric film 20 is deformed. The piezoelectric film 20 generates charge, and the sensor 15 outputs a voltage as shown by a solid line in FIG. 4(B). On the other hand, when the user only grips the operation unit 12, the output value of the sensor 15 is small as shown by a broken line in FIG. 4(B). This is because no shear stress that forms the direction of 45 degrees with respect to the uniaxial stretching direction (arrow 901) of the piezoelectric film 20 is generated, and no large charge is generated on the piezoelectric film 20. Therefore, depending on the magnitude of the output from the sensor 15, it is possible to distinguish when the user grips the operation unit 12 and when the user grips and further performs operation of rotating the operation unit 12.

For example, a predetermined threshold is stored in a processing unit (not shown) in advance. The rotation operation detection mechanism 101 can distinguish that the user rotates the operation unit 12 when the magnitude of the output from the sensor 15 is equal to or greater than a predetermined threshold, and that the user only grips the operation unit 12 when the magnitude of the output from the sensor 15 is smaller than the predetermined threshold.

Further, as an amount of rotation of the operation unit 12 by the user is larger, the shear stress generated on the operation unit 12 is larger. The output from the sensor 15 becomes larger in proportion to an amount of rotation of the operation unit 12 by the user. Therefore, the rotation operation detection mechanism 101 can distinguish an amount of rotation of the operation unit 12 based on the magnitude of the output from the sensor 15.

Further, when the user rotates the operation unit 12 counterclockwise as shown by arrow 900 in FIG. 1(A) has been described; however, when the user rotates the operation unit 12 in a clockwise direction opposite to arrow 900 in FIG. 1(A), all the shear stresses generated on the operation unit 12 are in a direction 90 degrees different as compared to the case where the user rotates the operation unit 12 counterclockwise. Therefore, the polarity of the charge generated on the piezoelectric film 20 is reversed, and the polarity of the output from the sensor 15 is reversed. Therefore, whether the user has rotated the operation unit 12 clockwise or counterclockwise can be distinguished based on the polarity of the output from the sensor 15.

Figure 5A:
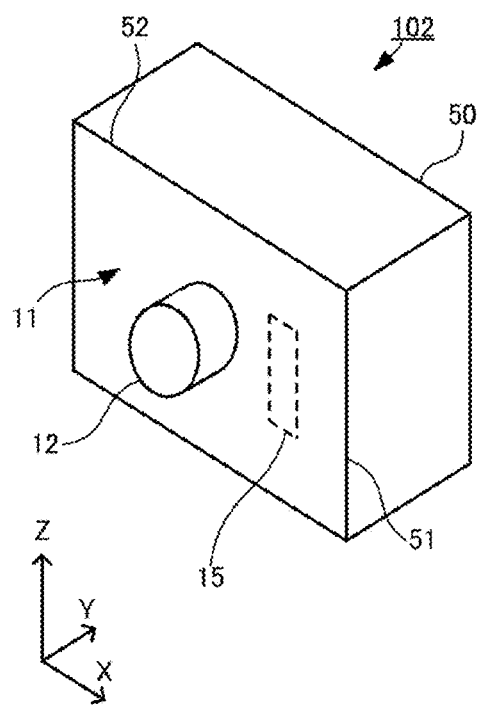
FIGS. 5(A) to 5(C) are diagrams for explaining the rotation operation detection mechanism according to a second embodiment.

Hereinafter, a rotation operation detection mechanism 102 according to a second embodiment will be described. FIG. 5(A) is a perspective view of the rotation operation detection mechanism 102 according to the second embodiment.

Figure 5B:
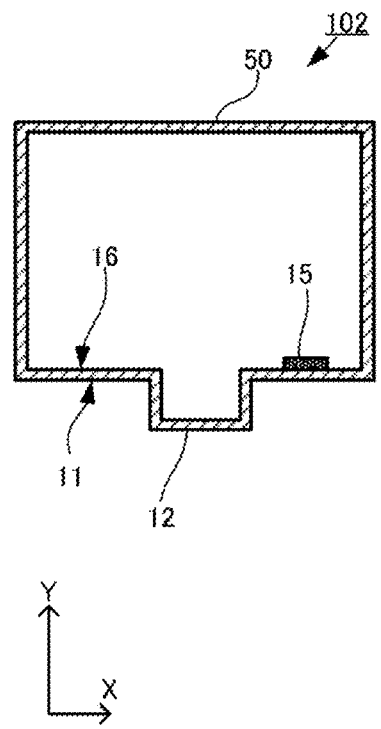
Figure 5C:
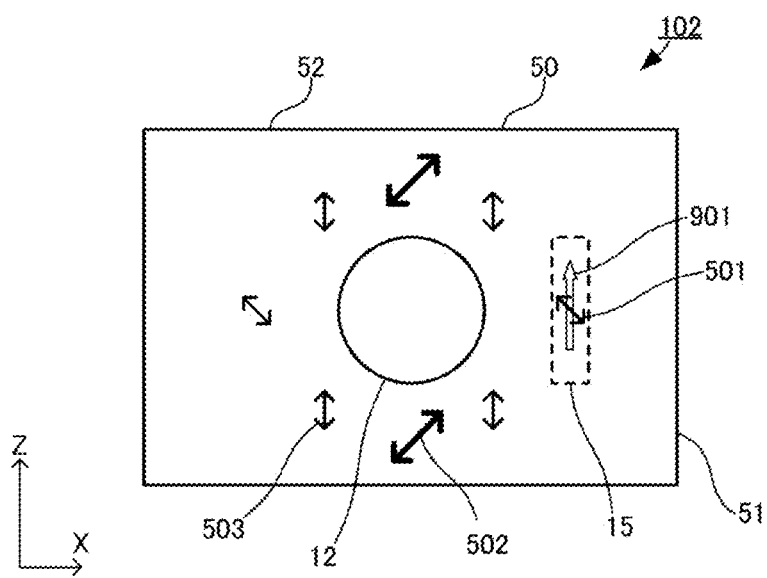

FIG. 5(B) is a cross-sectional view when the rotation operation detection mechanism 102 is cut along the X-Y plane. FIG. 5(C) is a diagram schematically showing a shear stress generated when the user operates to rotate the operation unit 12 of the rotation operation detection mechanism 102, and is a side view of a case where the operation surface 11 is viewed from a −Y direction toward the Y direction. The rotation operation detection mechanism 102 according to the second embodiment has a substantially similar configuration to that of the first embodiment, except that the rotation operation detection mechanism 102 includes one of the operation unit 12 and the arrangement of the sensor 15 is different. Therefore, in the second embodiment, only the differences from the first embodiment will be described, and the rest will be omitted.

As shown in FIGS. 5(A) and 5(B), the rotation operation detection mechanism 102 includes one of the operation unit 12. Note that a plurality of the operation units 12 may be provided as in the first embodiment. The sensor 15 is adhered to the back side 16 of a housing 50. The sensor 15 is disposed on locations other than the operation unit 12 on the operation surface 11. For this reason, the sensor 15, which can be adhered to a flat place, is easily disposed.

As shown in FIG. 5(C), the sensor 15 is disposed along a direction parallel to the Z direction which is a tangential direction of the operation unit 12 in the circumferential direction. The operation surface 11 includes a short side 51 and a long side 52. Since the sensor 15 is disposed along a direction parallel to the short side 51, positioning of the sensor 15 when attached to the back side 16 of the housing 50 is easy.

When the user grips the operation unit 12 and applies a force in the direction in which the operation unit 12 rotates on the X-Z plane, a shear stress is generated around the operation unit 12. Shear stresses as indicated by arrows 501, 502, and 503 are generated on the operation surface 11. Each of the shear stresses is generated so as to be mainly at 45 degrees with respect to the tangential direction of the operation unit 12.

Since the sensor 15 is disposed along a direction parallel to the tangential direction of the operation unit 12, the shear stress is mainly generated in the direction of 45 degrees with respect to the uniaxial stretching direction (arrow 901) of the piezoelectric film 20 of the sensor 15 as shown in FIG. 5(C). Therefore, the sensor 15 can output a voltage value according to the shear stress.

It is also noted that the sensor 15 may be disposed along a direction orthogonal to the tangential direction of the operation unit 12. For example, there is a case where the sensor 15 shown in FIG. 5(A) is rotated by 90 degrees at a position where the sensor 15 is located, and is adhered along the X-axis direction. Also in this case, the shear stress is generated to be in a direction mainly at 45 degrees with respect to the uniaxial stretching direction (arrow 901) of the piezoelectric film 20 of the sensor 15. Therefore, the sensor 15 outputs a large voltage value.

Further, when the operation unit 12 is merely gripped, the stress is mainly generated on a side surface of the operation unit 12. For this reason, large stress is not transmitted to a location of the sensor 15 disposed on locations other than the operation unit 12 on the operation surface 11. Therefore, the sensor 15 can detect only an amount of rotation of the operation unit 12 in the rotation operation detection mechanism 102. For this reason, the rotation operation detection mechanism 102 can more accurately detect the rotation of the operation unit 12.

Hereinafter, a rotation operation detection mechanism 103 according to a third embodiment will be described.

Figure 6A:
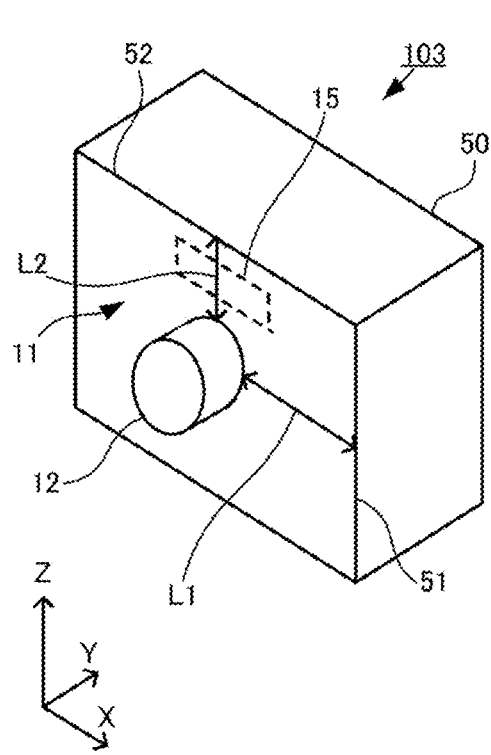
FIGS. 6(A) to 6(C) are diagrams for explaining the rotation operation detection mechanism according to a third embodiment.
Figure 6B:
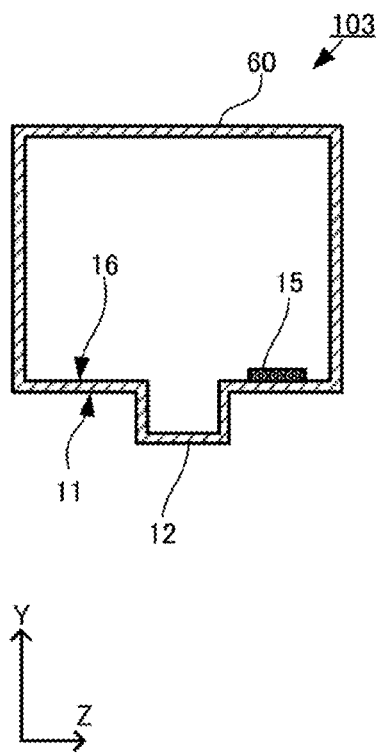
Figure 6C:
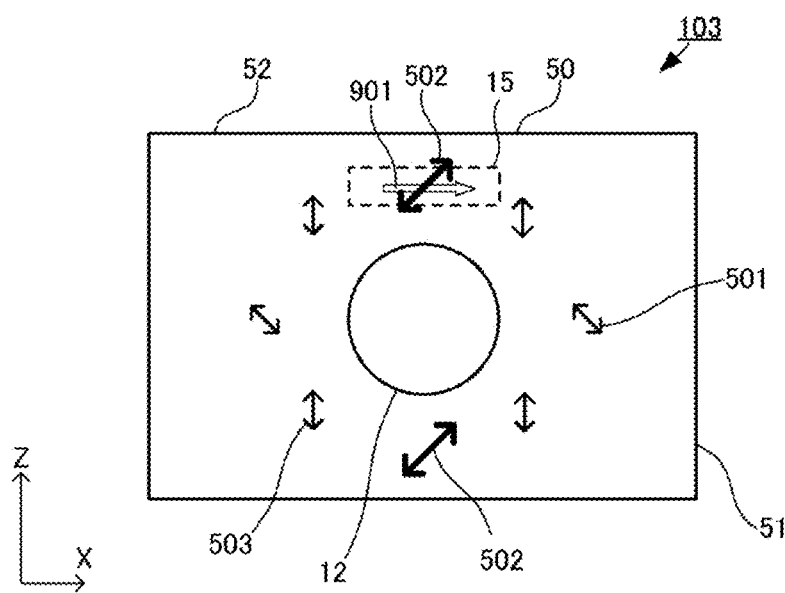

FIG. 6(A) is a perspective view of the rotation operation detection mechanism 103 according to the third embodiment. FIG. 6(B) is a cross-sectional view when the rotation operation detection mechanism 103 is cut along the Y-Z plane. FIG. 6(C) is a diagram schematically showing a shear stress generated when the user operates to rotate the operation unit 12 of the rotation operation detection mechanism 103, and is a side view of a case where the operation surface 11 is viewed from the −Y direction toward the Y direction. The rotation operation detection mechanism 103 according to the third embodiment has a substantially similar configuration to the second embodiment except that the arrangement of the sensor 15 is different. Therefore, in the third embodiment, only the differences from the second embodiment will be described, and the rest will be omitted.

As shown in FIGS. 6(A), 6(B) and 6(C), the sensor 15 is attached to the back side 16 of the housing 50. End portions of the operation surface 11 are the short side 51 and the long side 52. The sensor 15 is disposed on locations other than the operation unit 12 on the operation surface 11.

The sensor 15 is disposed between the operation unit 12 and an end portion of the operation surface 11 where a shortest distance from the end portion of the operation surface 11 to the operation unit 12 is shortest. For example, when the operation unit 12 is disposed at the center of the operation surface 11, a distance L2 from the center of the long side 52 to the operation unit 12 is shorter than a distance L1 from the center of the short side 51 to the operation unit 12, and the distance L2 between the center of the long side 52 and the operation unit 12 is shortest as compared with positions of the other end portions. In this case, the sensor 15 is disposed between the center of the long side 52 and the operation unit 12 along a direction parallel to a tangential direction of the operation unit 12 in the circumferential direction.

When the user grips the operation unit 12 and applies a force in the direction in which the operation unit 12 rotates on the X-Z plane, shear stresses as indicated by arrows 501, 502, and 503 are generated on the operation surface 11. An end portion of the operation surface 11 is fixed to another surface of the housing 10. For this reason, as a distance between the operation unit 12 and an end portion of the fixed operation surface 11 becomes smaller, a larger distortion is generated between the operation unit 12 and the end portion of the operation surface 11. Therefore, on the operation surface 11, a greater shear stress is generated at the position indicated by arrow 502 than at the positions indicated by arrows 501 and 503. Therefore, the sensor 15 of the rotation operation detection mechanism 103 can output a larger voltage value as compared to the rotation operation detection mechanism 102 according to the second embodiment. Therefore, the accuracy of rotation detection of the rotation operation detection mechanism 103 can be improved.

Figure 7A:
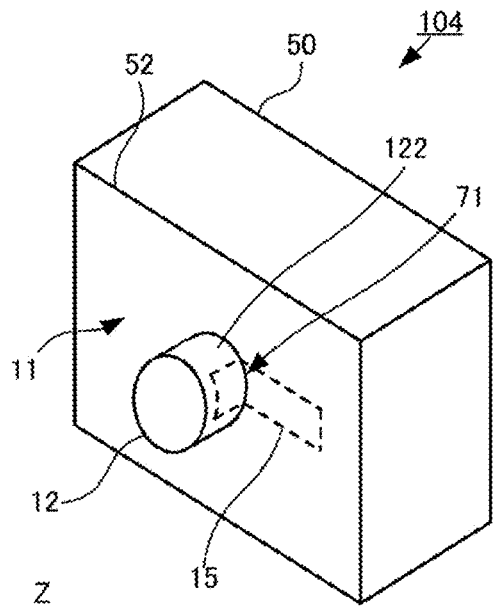
FIGS. 7(A) to 7(C) are diagrams for explaining the rotation operation detection mechanism according to a fourth embodiment.

Hereinafter, a rotation operation detection mechanism 104 according to a fourth embodiment will be described. FIG. 7(A) is a perspective view of the rotation operation detection mechanism 104 according to the fourth embodiment.

Figure 7B:
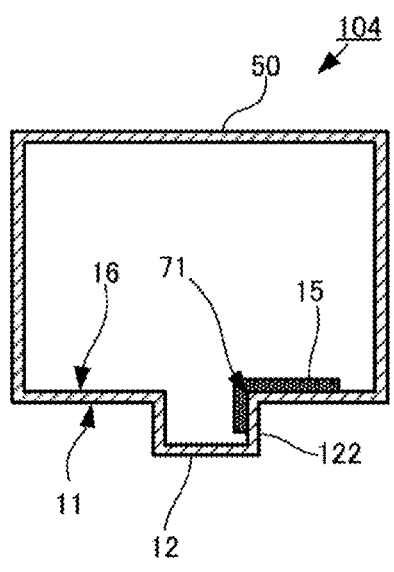
Figure 7C:
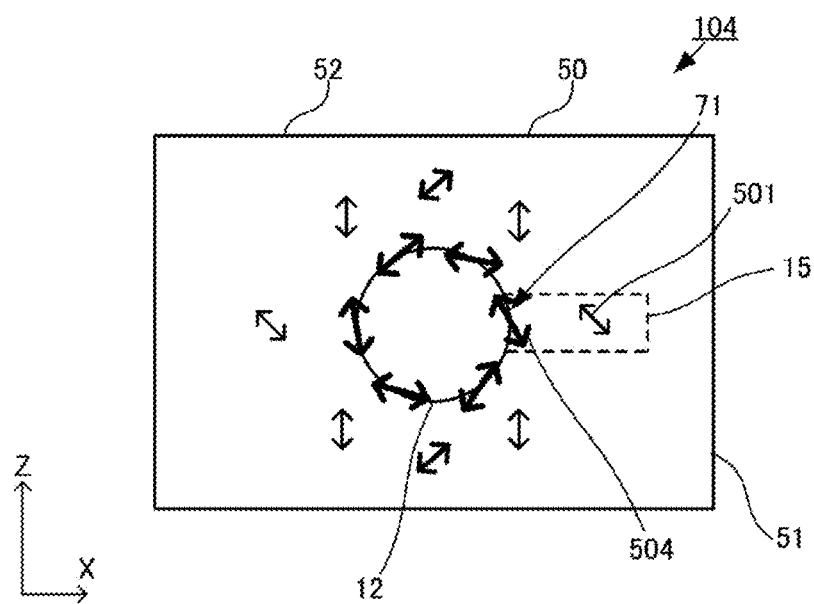

FIG. 7(B) is a cross-sectional view when the rotation operation detection mechanism 104 is cut along the X-Y plane. FIG. 7(C) is a diagram schematically showing a shear stress generated when the user operates to rotate the operation unit 12 of the rotation operation detection mechanism 104, and is a side view of a case where the operation surface 11 is viewed from the −Y direction toward the Y direction. The rotation operation detection mechanism 104 according to the fourth embodiment has a substantially similar configuration to the second embodiment except that the arrangement of the sensor 15 is different. Therefore, in the fourth embodiment, only the differences from the second embodiment will be described, and the rest will be omitted.

As shown in FIGS. 7(A) and 7(B), the sensor 15 is disposed on the back side 16 of the housing 50 so as to extend across a boundary 71 between the operation unit 12 and the housing 50 other than the operation unit 12. In other words, the sensor 15 is disposed so as to be continuous with the operation unit 12 and the housing 50 other than the operation unit 12 on the operation surface 11.

As shown in FIG. 7(B), a cross section of the housing 50 has a shape that changes greatly at the boundary 71. As shown in FIG. 7(C), when the user grips the operation unit 12 and applies a force in the direction in which the operation unit 12 rotates on the X-Z plane, a shear stress concentrates around the boundary 71. For example, as indicated by arrow 504, a larger shear stress is generated around the boundary 71 than in other portions of the operation surface 11. Moreover, in the sensor 15, the piezoelectric film 20 around the boundary 71 is greatly deformed. In this manner, the sensor 15 can output a larger voltage value. Therefore, the accuracy of rotation detection of the rotation operation detection mechanism 104 can be improved.

Figure 8A:
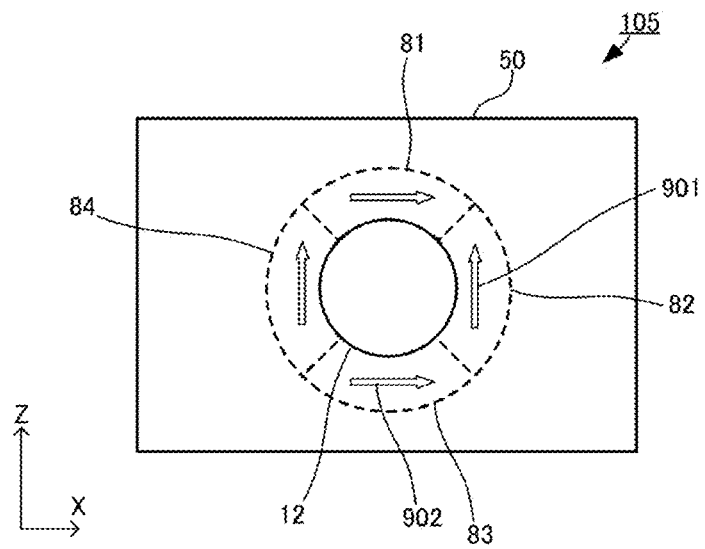
FIGS. 8(A) and 8(B) are diagrams for explaining the rotation operation detection mechanism according to a fifth embodiment.
Figure 8B:
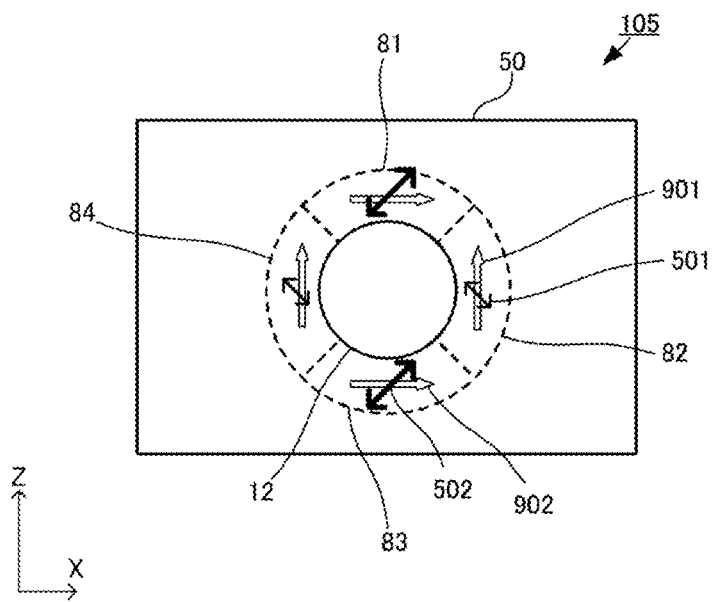

Hereinafter, a rotation operation detection mechanism 105 according to a fifth embodiment will be described. FIG. 8(A) is a side view when the rotation operation detection mechanism 105 is viewed from the −Y direction toward the Y direction. FIG. 8(B) is a diagram schematically showing a shear stress generated when the user operates the operation unit 12 of the rotation operation detection mechanism 105.

In the exemplary aspect, the rotation operation detection mechanism 105 has a substantially similar configuration to the second embodiment except that the shape, the number, and the arrangement of the sensors are different. Therefore, in the fifth embodiment, only the differences from the second embodiment will be described, and the rest will be omitted.

As shown in FIG. 8(A), the rotation operation detection mechanism 105 includes a sensor 81, a sensor 82, a sensor 83, and a sensor 84. The sensor 81, the sensor 82, the sensor 83, and the sensor 84 are each formed in a fan shape that is a 90-degree arc. The sensor 81, the sensor 82, the sensor 83, and the sensor 84 are disposed in an annular shape so as to surround the operation unit 12. Accordingly, the sensor 81, the sensor 82, the sensor 83, and the sensor 84 can be disposed around the operation unit 12 without any gap. For this reason, each of the sensors (the sensor 82, the sensor 83, and the sensor 84) can completely detect the shear stress generated around the operation unit 12.

The uniaxial stretching direction (arrow 901) of the piezoelectric film 20 in the sensor 82 and the sensor 84 is along the Z direction. A uniaxial stretching direction (arrow 902) of the piezoelectric film 20 in the sensor 81 and the sensor 83 is along the X direction. That is, the uniaxial stretching direction of the piezoelectric film 20 in the sensors 81, 82, 83, and 84 is parallel or perpendicular to a tangential line of the operation unit 12.

When the user grips the operation unit 12 and applies a force in the direction in which the operation unit 12 rotates on the X-Z plane, shear stresses as indicated by arrows 501 and 502 are generated on the operation surface 11 around the operation unit 12 as shown in FIG. 8(B).

The shear stresses indicated by arrows 501 and 502 form an angle of 45 degrees with respect to the uniaxial stretching direction of the piezoelectric film 20 in the sensors 81, 82, 83, and 84. In this manner, the sensor 81, the sensor 82, the sensor 83, and the sensor 84 can output a voltage value according to the shear stress. Further, the rotation operation detection mechanism 105, which includes a plurality of sensors, can output a larger voltage value by adding output values from the sensors. Therefore, the accuracy of rotation detection of the rotation operation detection mechanism 105 is further improved.

Figure 9A:
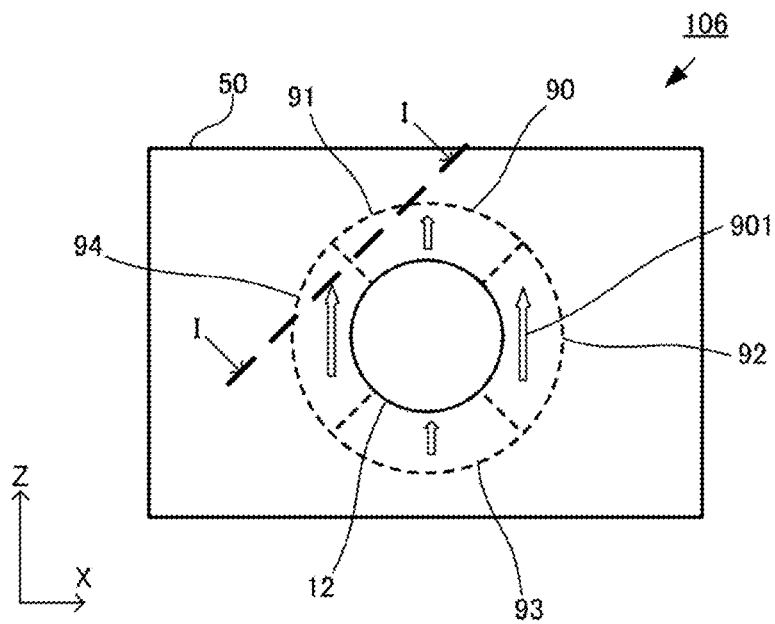
FIGS. 9(A) and 9(B) are diagrams for explaining the rotation operation detection mechanism according to a sixth embodiment.
Figure 9B:
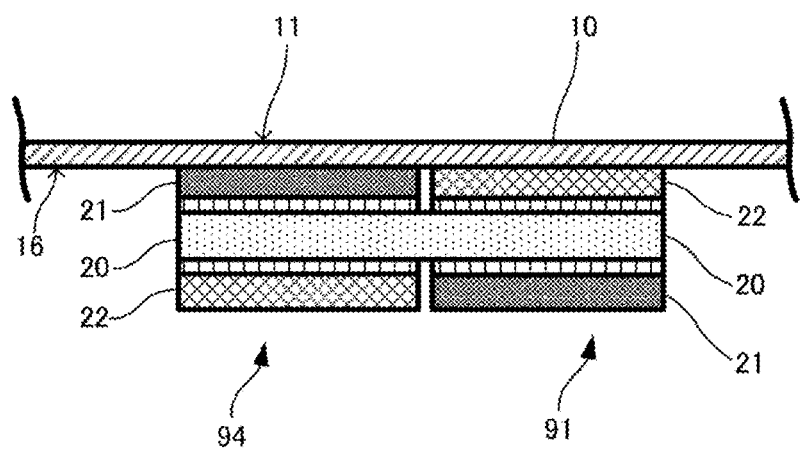

Hereinafter, a rotation operation detection mechanism 106 according to a sixth embodiment will be described. FIG. 9(A) is a side view when the rotation operation detection mechanism 106 is viewed from the −Y direction toward the Y direction. FIG. 9(B) is an enlarged cross-sectional view of part of the rotation operation detection mechanism 106 shown in FIG. 9(A) cut along a broken line I-I. The rotation operation detection mechanism 106 has a substantially similar configuration to the fifth embodiment except that the shape of the sensor and the number of the piezoelectric films 20 are different. Therefore, in the sixth embodiment, only the differences from the fifth embodiment will be described, and the rest will be omitted.

As shown in FIG. 9(A), the rotation operation detection mechanism 106 includes a sensor 90. The sensor 90 is formed in an O shape. The sensor 90 is disposed so as to surround the operation unit 12. The sensor 90 includes the single O-shaped piezoelectric film 20. The uniaxial stretching direction (arrow 902) of the piezoelectric film 20 in the sensor 90 is along the Z direction. Since the piezoelectric film 20 of the sensor 90 is formed as a single sheet, the trouble of adhering a plurality of the piezoelectric films 20 as in the fifth embodiment can be omitted.

Here, as shown in FIG. 9(A), the sensor 90 is shown divided into four regions (region 91, region 92, region 93, and region 94). As shown in FIG. 9(B), in the sensor 90, electrodes are divided into each region. In each region of the sensor 90, the first electrodes 21 and the second electrodes 22 are arranged in reverse order alternately. In the region 91, the second electrode 22 and the first electrode 21 are stacked in this order so as to sandwich the piezoelectric film 20 from the operation surface 11 side of the housing 10. In the region 94, the first electrode 21 and the second electrode 22 are stacked in this order so as to sandwich the piezoelectric film 20 from the housing 10 side. The region 93 is similar to the region 91, and the region 92 is similar to the region 94.

When the first electrode 21 is a signal electrode and the second electrode 22 is a ground electrode, in the region 91 and the region 93, the first electrode 21 as a signal electrode is disposed in a direction opposite to the operation surface 11 of the piezoelectric film 20. On the other hand, in the regions 92 and 94, the first electrodes 21 as a signal electrode is disposed on the operation surface 11 side of the piezoelectric film 20. When the sensor 90 receives similar deformation in the regions 91 and 93 and in the regions 94 and 92, the piezoelectric film 20 detects charges of opposite polarities.

When the user grips the operation unit 12 and applies a force in the direction in which the operation unit 12 rotates in the X-Z plane, shear stresses as indicated by arrow 501 and arrow 502 are generated on the operation surface 11 around the operation unit 12 like in FIG. 8(B).

Directions of shear stresses are different between the regions 91 and 93 and the regions 94 and 92. For this reason, different shear stresses are transmitted to the piezoelectric film 20 in the region 91 and the region 93 and in the region 94 and the region 92. However, in the region 91 and the region 93, and in the region 94 and the region 92, the first electrode 21 and the second electrode 22 are arranged in reverse order. Accordingly, the sensor 90 detects charges of the same polarity from an electrode pair including the first electrode 21 and the second electrode 22 of each of the regions. Therefore, the sensor 90 can output a larger voltage value by adding output values from the electrode pair and thus the accuracy of the rotation detection of the rotation operation detection mechanism 106 is further improved.

It is also noted that the first electrode 21 and the second electrode 22 can be similarly arranged in the region 91 and the region 93 and in the region 94 and the region 92. In this case, for example, charges obtained from an electrode pair including the first electrode 21 and the second electrode 22 in the region 91 and the region 93 are inverted by a processing unit (not shown). In this manner, the sensor 90 can output a larger voltage value by adding a voltage value obtained from the regions 91 and 93 and an inverted voltage value obtained from the regions 94 and 92.

Figure 10A:
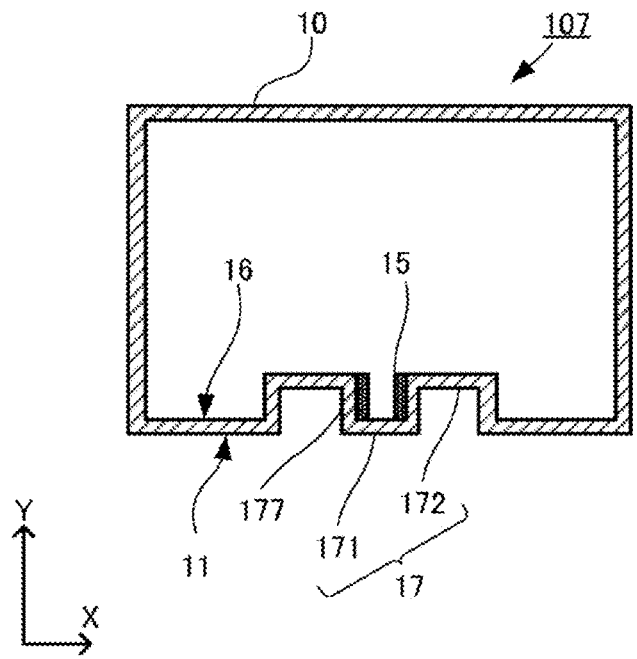
FIG. 10(A) is a diagram for explaining the rotation operation detection mechanism according to a seventh embodiment.
Figure 10B:
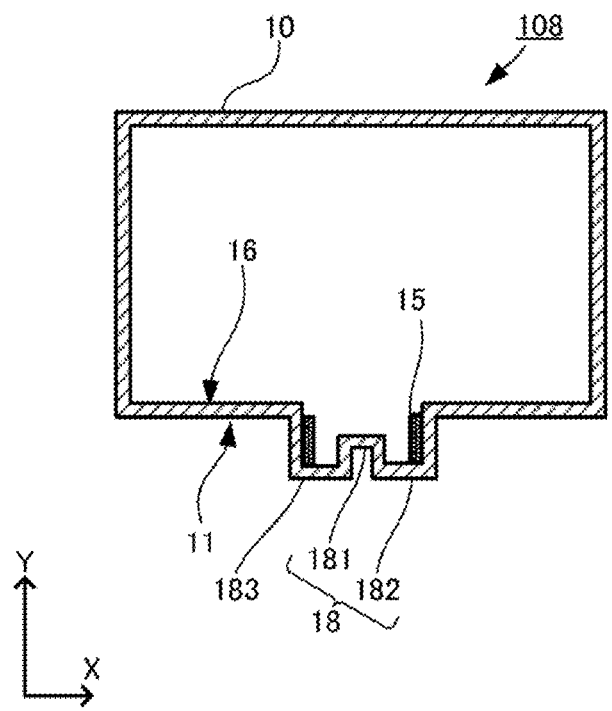
FIG. 10(B) is a diagram for explaining the rotation operation detection mechanism according to an eighth embodiment.

Hereinafter, a rotation operation detection mechanism 107 according to a seventh embodiment and a rotation operation detection mechanism 108 according to an eighth embodiment will be described. FIG. 10(A) is a cross-sectional view when the rotation operation detection mechanism 107 according to the seventh embodiment is cut along the X-Y plane. FIG. 10(B) is a cross-sectional view when the rotation operation detection mechanism 108 according to the eighth embodiment is cut along the X-Y plane. The rotation operation detection mechanism 107 according to the seventh embodiment and the rotation operation detection mechanism 108 according to the eighth embodiment have substantially similar configurations as those in the first embodiment except that the number and the shape of operation units are different. Therefore, in the seventh embodiment and the eighth embodiment, only the differences from the first embodiment will be described, and the rest will be omitted.

As shown in FIG. 10(A), the rotation operation detection mechanism 107 includes an operation unit 17. As shown in FIG. 10(B), the rotation operation detection mechanism 108 includes an operation unit 18. Part of the operation unit 17 and the operation unit 18 protrudes to the back side 16 of the operation surface 11.

In the rotation operation detection mechanism 107, the operation unit 17 includes a central portion 171 and an outer peripheral portion 172. The central portion 171 is located on the same plane as a portion other than the operation portion 17 on the operation surface 11 side of the housing 10. The outer peripheral portion 172 protrudes to the back side 16 of the operation surface 11 and is positioned on an inner side of the housing 10 than a portion other than the operation unit 17 on the operation surface 11 side of the housing 10. The sensor 15 is disposed on a side surface 177 of the central portion 171. The side surface 177 exists at a position recessed from the operation surface 11 side of the housing 10 toward an internal side of the housing 10. For this reason, the sensor 15 disposed on the side surface 177 is hardly affected by the outside. Therefore, it is possible to prevent erroneous detection in a case of, for example, the user collides with the housing 10.

In the rotation operation detection mechanism 108, the operation unit 18 includes a central portion 181 and an outer peripheral portion 182. The outer peripheral portion 182 protrudes on the operation surface 11 side from a portion other than the operation portion 18 on the operation surface 11 side of the housing 10. That is, an end portion 183 of the operation unit 18 protrudes on the operation surface 11 side. The central portion 181 protrudes from the outer peripheral portion 182 toward the back side 16 of the operation surface 11. For this reason, the strength of the end portion 183 of the operation unit 18 increases. Therefore, it is possible to prevent erroneous detection when, for example, the user collides with the end portion 183.

Figure 11A:
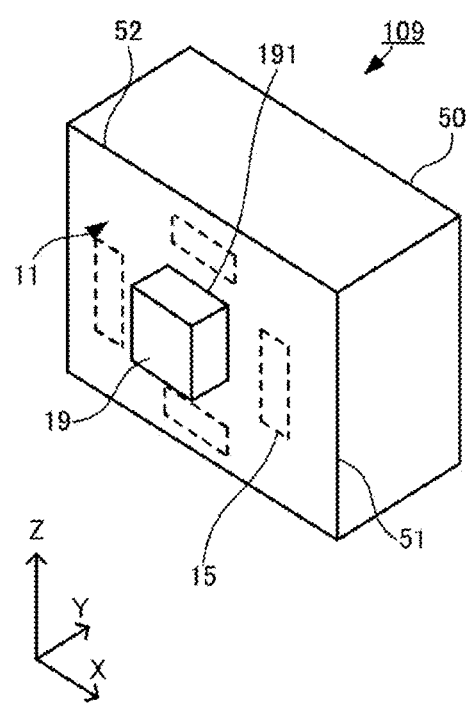
FIGS. 11(A) to 11(C) are diagrams for explaining the rotation operation detection mechanism according to a ninth embodiment.
Figure 11B:
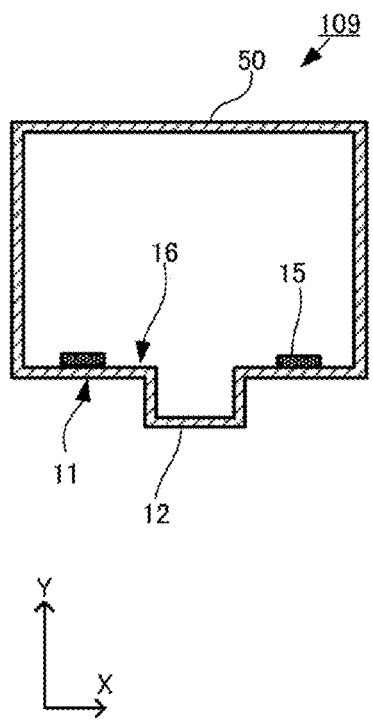
Figure 11C:
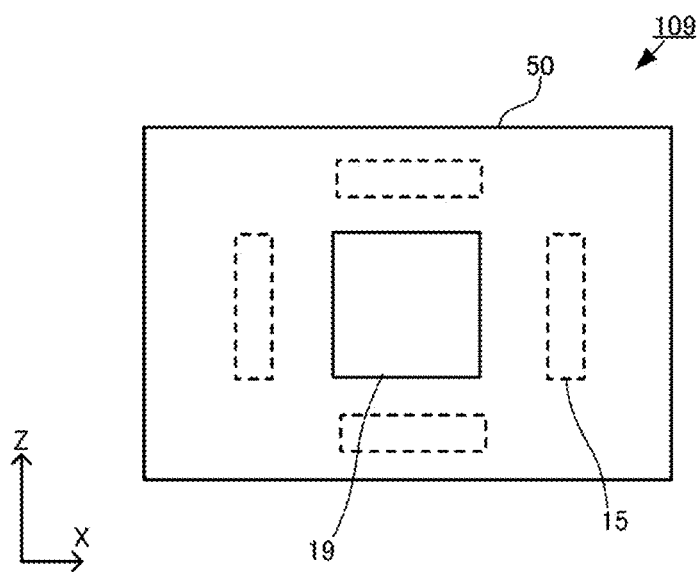

Hereinafter, a rotation operation detection mechanism 109 according to a ninth embodiment will be described. FIG. 11(A) is a perspective view of the rotation operation detection mechanism 109 according to the ninth embodiment. FIG. 11(B) is a cross-sectional view when the rotation operation detection mechanism 109 is cut along the X-Y plane. FIG. 11(C) is a side view when the rotation operation detection mechanism 109 is viewed from the −Y direction toward the Y direction. The rotation operation detection mechanism 109 according to the ninth embodiment has a substantially similar configuration to that of the first embodiment except that the shape of the operation unit and the number and arrangement of sensors are different. Therefore, in the ninth embodiment, only the differences from the first embodiment will be described, and the rest will be omitted.

As shown in FIGS. 11(A) to 11(C), in the rotation operation detection mechanism 109, an operation unit 19 has a rectangular parallelepiped shape. An end portion of the operation unit 19 has a rectangular shape having sides parallel to the Z-X direction. For this reason, a boundary 191 between the operation unit 19 and the housing 50 other than the operation unit 19 is also rectangular.

The rotation operation detection mechanism 109 includes a plurality of the sensors 15. A plurality of the sensors 15 are disposed in parallel with four sides of the boundary 191. That is, a plurality of the sensors 15 are disposed parallel to the X direction or the Z direction. In this manner, the rotation operation detection mechanism 109 can output a larger voltage value by adding output values from the sensors. Therefore, the accuracy of rotation detection of the rotation operation detection mechanism 109 is further improved.

Figure 12A:
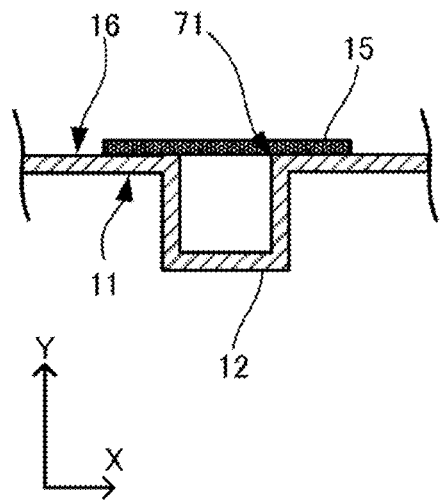
FIGS. 12(A) to 12(D) are diagrams for explaining a variation of the rotation operation detection mechanism according to the first embodiment.
Figure 12B:
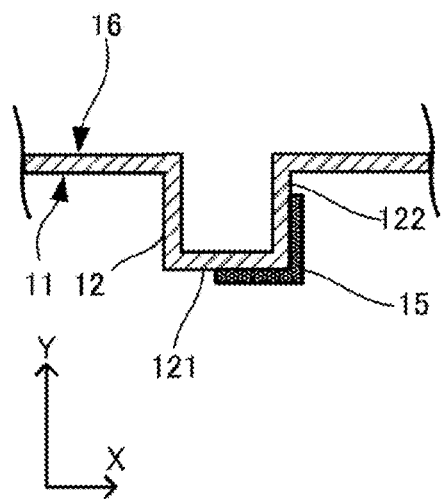
Figure 12C:
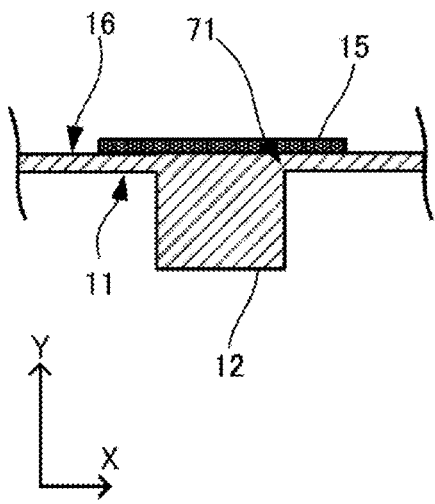
Figure 12D:
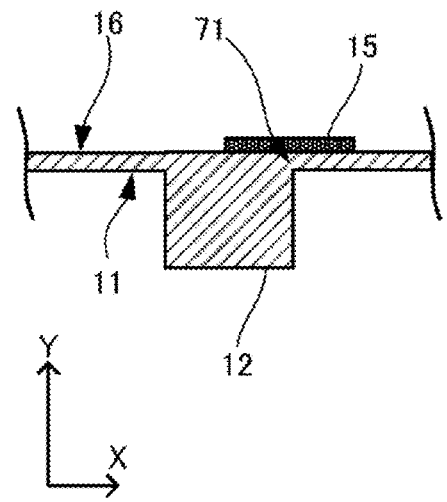

Hereinafter, a variation according to the first embodiment will be described. FIG. 12(A) is a diagram showing a first variation, FIG. 12(B) is a diagram showing a second variation, FIG. 12(C) is a diagram showing a third variation, and FIG. 12(D) is a diagram showing a fourth variation. Note that FIGS. 12(A) to 12(D) are enlarged cross-sectional views of a portion around each operation unit cut along the X-Y plane. The first to fourth variations have substantially similar configurations to the first embodiment except that the arrangement of the sensor 15 and the shape of the operation unit are different. Therefore, in the first to fourth variations, only the differences from the first embodiment will be described, and the rest will be omitted.

As shown in FIG. 12(A), in the first variation, the sensor 15 is disposed to vertically cross the operation unit 12 when the operation unit 12 is viewed from the −Y direction toward the Y direction, that is, in plan view. For this reason, the sensor 15 can detect a shear stress generated at the boundary 71 between the operation unit 12 and the housing 10 other than the operation unit 12.

As shown in FIG. 12(B), in the second variation, the sensor 15 is disposed from an end portion 121 of the operation unit 12 to a side surface 122. Further, the sensor 15 is adhered to the operation surface 11 side of the housing 10. The sensor 15 is fixed at the end portion 121 of the operation unit 12 to which no force is applied by the user. For this reason, when the user applies a force to the side surface 122, even if the sensor 15 comes off the side surface 122, the sensor 15, which is fixed at the end portion 121 of the operation unit 12, can be prevented from peeling off from the housing 10.

As further shown in FIG. 12(C), in the third variation, the operation unit 12 has no gap. The sensor 15 is disposed so as to vertically cross the operation unit 12 in plan view, similarly to the first modification. For this reason, the sensor 15 can detect a shear stress generated at the boundary 71 between the operation unit 12 and the housing 10 other than the operation unit 12. Further, since the sensor 15 is attached to a flat surface, the sensor 15 can be easily adhered to the housing 10.

As shown in FIG. 12(D), in the fourth variation, the operation unit 12 has no gap. The sensor 15 is disposed so as to horizontally cross part of the operation unit 12 in plan view. For this reason, the sensor 15 can detect a shear stress generated at the boundary 71 between the operation unit 12 and the housing 10 other than the operation unit 12. Further, since the sensor 15 is attached to a flat surface, the sensor 15 can be easily adhered to the housing 10.

Figure 13A:
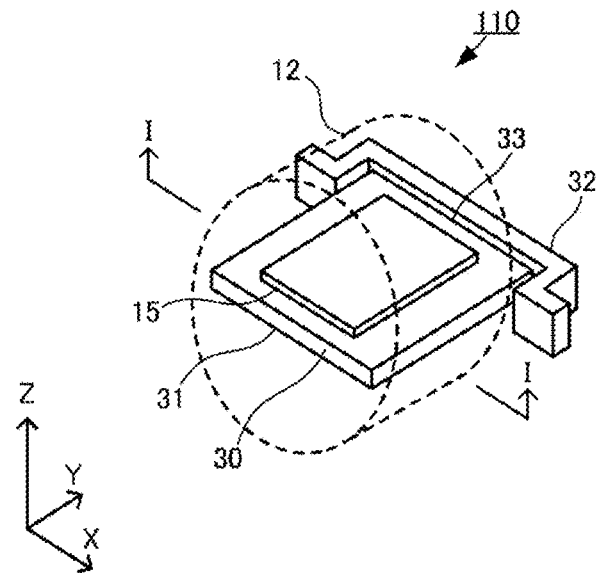
FIGS. 13(A) to 13(C) are diagrams for explaining the rotation operation detection mechanism according to a tenth embodiment.
Figure 13B:
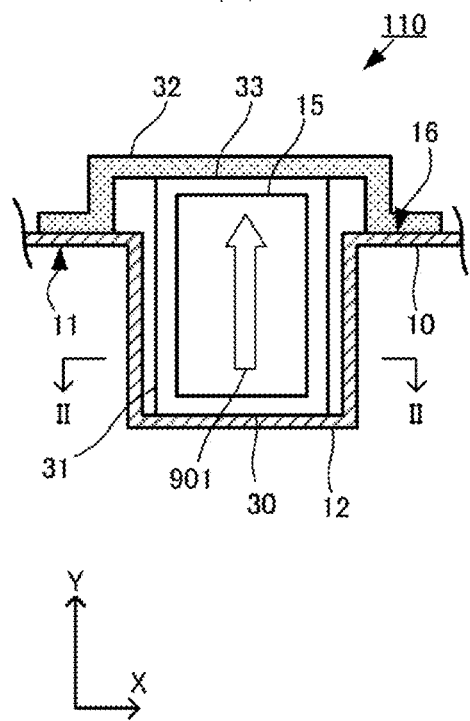
Figure 13C:
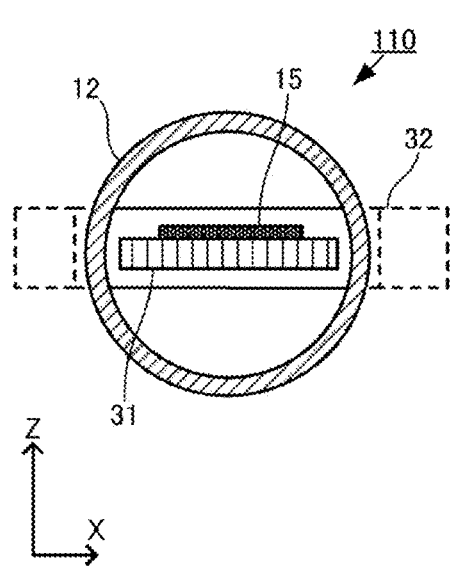

Hereinafter, a rotation operation detection mechanism 110 according to a tenth embodiment will be described. FIG. 13(A) is a perspective view of the rotation operation detection mechanism 110 according to the tenth embodiment. FIG. 13(B) is a cross-sectional view when the rotation operation detection mechanism 110 is cut along I-I of FIG. 13(A). FIG. 13(C) is a cross-sectional view when the rotation operation detection mechanism 110 is cut along II-II of FIG. 13(B). FIGS. 13(A) to 13(C) show only a portion around the operation unit 12 of the rotation operation detection mechanism 110. Further, FIG. 13(A) shows the operation unit 12 by a broken line as transparent. The cut surface II-II of FIG. 13(B) is further in the Z direction than the sensor 15. FIG. 13(C) shows part of a support portion 32 by a broken line and through the housing 10.

The rotation operation detection mechanism 110 according to the tenth embodiment has a substantially similar configuration to that of the first embodiment, except that the rotation operation detection mechanism 110 includes a holding portion 31 and the support portion 32, and the arrangement of the sensor 15 is different. Therefore, in the tenth embodiment, only the differences from the first embodiment will be described, and the rest will be omitted.

As shown in FIGS. 13(A) to 13(C), the rotation operation detection mechanism 110 includes the holding portion 31 and the support portion 32. The holding portion 31 is disposed on the back side 16 of the operation surface 11 of the operation unit 12. The support portion 32 is disposed on the back side 16 of the housing 10 on the operation surface 11. Further, part of the support portion 32 is disposed so as to face the operation unit 12.

The holding portion 31 is a flat plate shape. Both main surfaces of the holding portion 31 have a rectangular shape that is longer in the Y direction than in the X direction. A longitudinal direction of the holding portion 31 is the Y direction, and a short direction of the holding portion 31 is the X direction. The sensor 15 is disposed on one main surface of the holding portion 31. The sensor 15 has a rectangular shape that is longer the Y direction than in the X direction. When the holding portion 31 is cut along the X-Z plane, a cross section of the holding portion 31 is rectangular. Note that the holding portion 31 only needs to be able to hold the sensor 15, and may have a film shape with a small thickness in the Z direction. Further, the cross section of the holding portion 31 when cut along the X-Z plane is not limited to a flat plate shape, and may be, for example, a polygonal column shape or an ellipse.

The sensor 15 is adhered to the holding portion 31 so that the uniaxial stretching direction (arrow 901) is parallel to the Y direction. Note that the sensors 15 may be disposed on both main surfaces of the holding portion 31. In this manner, an entire area of the sensor 15 becomes large, and an output of the entire sensor 15 becomes large. Further, the sensor 15 may be adhered to the holding portion 31 so that the uniaxial stretching direction (arrow 901) is perpendicular to the Y direction.

One end 30 of the holding portion 31 is fixed to the back side 16 of the operation unit 12. The other end 33 of the holding portion 31 is fixed to the support portion 32. The holding portion 31 is fixed by the back side 16 of the operation unit 12 and the support portion 32. The holding portion 31 is fixed to the operation unit 12 and the support portion 32 by a publicly-known method such as a screw and an adhesive. The holding portion 31 is positioned substantially at the center of the operation unit 12. The holding portion 31 is likely to be influenced by deformation of the operation unit 12 as compared to a case where the holding portion 31 is at a position other than the center of the operation unit 12. For this reason, the holding portion 31 can easily catch deformation of the operation unit 12 accurately.

Part of the support portion 32 protrudes from the operation surface 11 to the inside of the housing 10. In this manner, the holding portion 31 can be ensured to have a long length in the Y direction. Further, since the area of the sensor 15 disposed on the holding portion 31 is large in the Y direction, the output of the entire sensor 15 is large. Further, when the user grips the operation unit 12 and applies a force in the direction in which the operation unit 12 rotates on the X-Z plane, the holding portion 31 is more easily twisted as the length in the Y direction of the holding portion 31 is larger. Accordingly, since the deformation of the sensor 15 becomes significant, the output of the sensor 15 becomes large. Note that the support portion 32 does not need to protrude from the operation surface 11 to the inside of the housing 10. For example, when the support portion 32 has a flat plate shape, the support portion 32 is easily formed.

The holding portion 31 and the support portion 32 may be formed of the same material as the housing 10, or may be formed of a different material. The material of the holding portion 31 and the supporting portion 32 is, for example, aluminum, an aluminum alloy, stainless steel, resin, or the like.

Figure 14A:
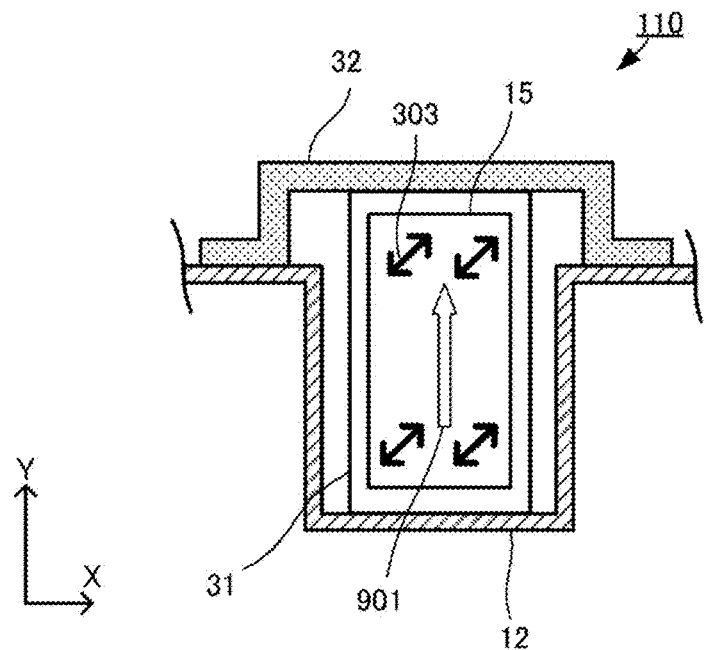
FIG. 14(A) is a diagram schematically showing a shear stress generated in a case where the user operates the rotation operation detection mechanism according to the tenth embodiment.
Figure 14B:
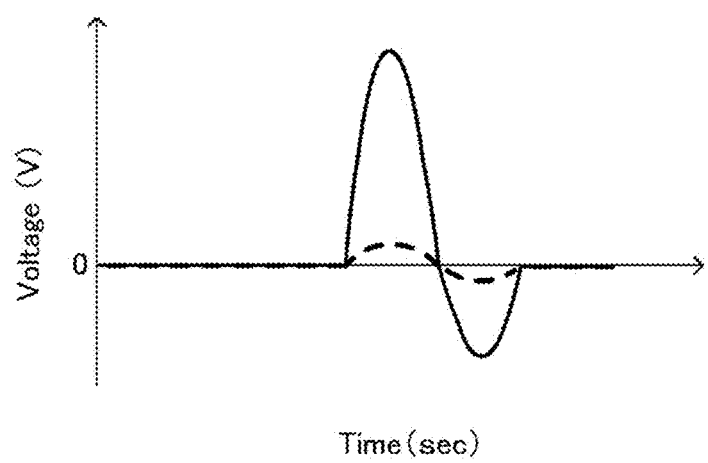
FIG. 14(B) is a diagram showing an output value of the sensor in a case where the user operates to rotate the operation unit or in a case where the user grips the operation unit.

FIG. 14(A) is a diagram schematically showing a shear stress generated when the user operates the rotation operation detection mechanism 110. FIG. 14(B) is a diagram showing an output value of the sensor 15 when the user operates to rotate the operation unit 12 or when the user grips the operation unit 12.

As shown in FIG. 14(A), when the user grips the operation unit 12 and applies a force in the direction in which the operation unit 12 rotates on the X-Z plane, a force applied to the operation unit 12 is transmitted to the holding portion 31 that exists in the operation unit 12. In this manner, a shear stress indicated by arrow 303 is generated in the holding portion 31. The shear stress mainly forms a direction of 45 degrees with respect to the longitudinal direction (Y direction) of the holding portion 31.

Since the sensor 15 is adhered to one main surface of the holding portion 31, the shear stress indicated by arrow 303 is also generated in the sensor 15. The sensor 15 is adhered so that the uniaxial stretching direction (arrow 901) of the piezoelectric film 20 is parallel to the Y direction. For this reason, the shear stress is generated to be in a direction mainly at 45 degrees with respect to the uniaxial stretching direction (arrow 901) of the piezoelectric film 20 of the sensor 15. Therefore, the sensor 15 can output a voltage value according to the shear stress. Note that, even when the sensor 15 is adhered so that the uniaxial stretching direction (arrow 901) of the piezoelectric film 20 is perpendicular to the Y direction, a shear stress is generated to be in a direction mainly at 45 degrees with respect to the uniaxial stretching direction (arrow 901), and a similar effect can be obtained.

Due to the deformation of the piezoelectric film 20, the sensor 15 generates charges. When the user grips the operation unit 12 and applies a force in the direction in which the operation unit 12 rotates on the X-Z plane, the sensor 15 outputs a voltage as indicated by a solid line in FIG. 14(B). On the other hand, when the user only grips the operation unit 12, the operation unit 12 is only slightly deformed from the front side to the back side. In this case, the force applied to the operation unit 12 by the user is hardly transmitted to the holding portion 31. For this reason, as indicated by a broken line in FIG. 14(B), an output value of the sensor 15 becomes small. Depending on the magnitude of the output from the sensor 15, the rotation operation detection mechanism 110 can distinguish a case where the user grips the operation unit 12 and a case where the user grips and further performs operation of rotating the operation unit 12. Therefore, the rotation operation detection mechanism 110 can more accurately detect the rotation of the operation unit 12.

Hereinafter, a rotation operation detection mechanism 111 according to an eleventh embodiment will be described.

Specifically, FIG. 15(A) is a perspective view of the rotation operation detection mechanism 111 according to the eleventh embodiment. FIG. 15(B) is a cross-sectional view when the rotation operation detection mechanism 111 is cut along I-I in FIG. 15(A). FIG. 15(C) is a cross-sectional view when the rotation operation detection mechanism 111 is cut along II-II in FIG. 15(B). It should be appreciated that FIGS. 15(A) to 15(C) show only a portion around the operation unit 12 of the rotation operation detection mechanism 111. Further, FIG. 15(A) shows the operation unit 12 by a broken line as transparent. The cut surface of FIG. 15(B) is further in the positive side of the Z direction than the sensor 15.

The rotation operation detection mechanism 111 according to the eleventh embodiment has a substantially similar configuration to that of the tenth embodiment, except that the rotation operation detection mechanism 111 does not include the support portion 32, and the arrangement of a holding portion 41 is different. Therefore, in the eleventh embodiment, only the differences from the tenth embodiment will be described, and the rest will be omitted.

As shown in FIGS. 15(A) to 15(C), the rotation operation detection mechanism 111 includes the holding portion 41 that has a flat plate shape, and is disposed on the back side 16 of the operation surface 11 of the operation unit 12. The one end 30 of the holding portion 41 is connected to the back side 16 of the operation unit 12. The other end 33 of the holding portion 41 is not fixed. End portions 34 and 35 in the X direction of the holding portion 41 are connected to the back side 16 of the operation unit 12. That is, the holding portion 41 is fixed in three directions by the back side 16 of the operation unit 12. Therefore, since the rotation operation detection mechanism 111 has no support portion, the structure can be simplified.

When the user grips the operation unit 12 and applies a force in the direction in which the operation unit 12 rotates in the X-Z plane, the deformation of the operation unit 12 is transmitted from the one end 30, the end portion 34, and the end portion 35 of the holding portion 41 to the holding portion 41. In this manner, a shear stress is generated in the sensor 15 as in the case of the rotation operation detection mechanism 110. Therefore, the rotation operation detection mechanism 111 can detect the rotation of the operation unit 12.

Hereinafter, a rotation operation detection mechanism 112 according to a twelfth embodiment will be described.

Figure 16A:
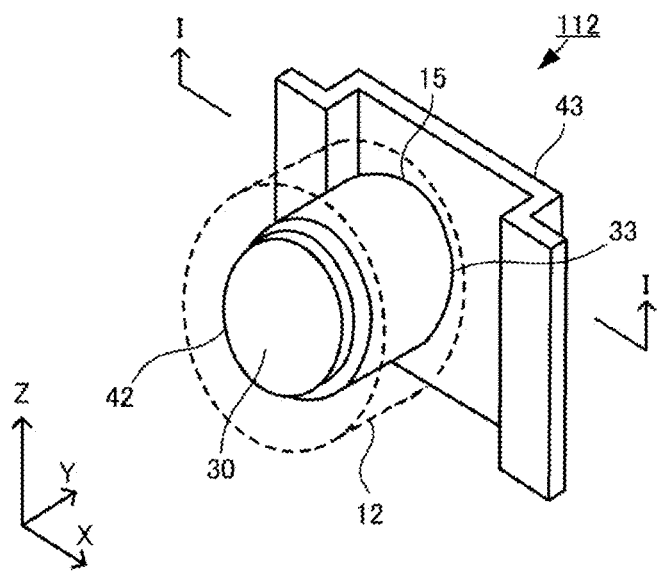
FIGS. 16(A) to 16(C) are diagrams for explaining the rotation operation detection mechanism according to a twelfth embodiment.
Figure 16B:
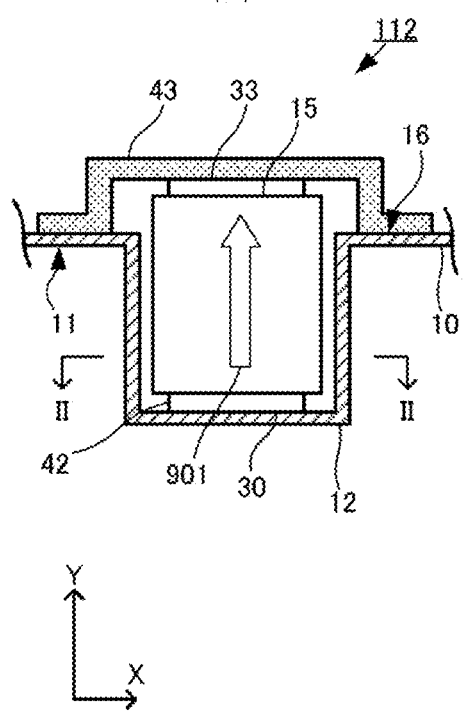
Figure 16C:
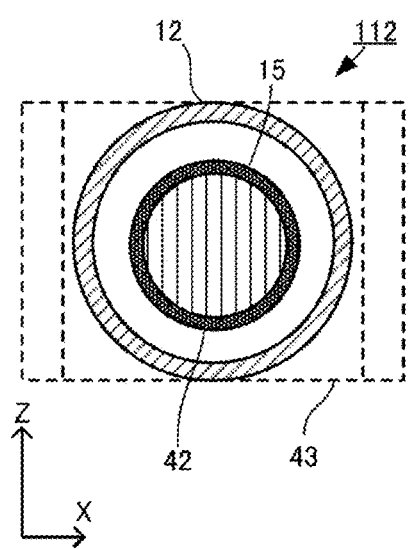

In particular, FIG. 16(A) is a perspective view of the rotation operation detection mechanism 112 according to the twelfth embodiment. FIG. 16(B) is a partial cross-sectional view when the rotation operation detection mechanism 112 is cut along I-I in FIG. 16(A). FIG. 16(C) is a cross-sectional view when the rotation operation detection mechanism 112 is cut along II-II in FIG. 16(B). FIGS. 16(A) to 16(C) show only a portion around the operation unit 12 of the rotation operation detection mechanism 112. FIG. 16(A) shows the operation unit 12 by a broken line as transparent. The cut surface of FIG. 16(B) is further in the positive side of the Z direction than the sensor 15. FIG. 16(B) shows only the operation unit 12 and the support portion 32 in a cross-sectional view, and is a diagram as viewed from the positive side to the negative side in the Z direction.

The rotation operation detection mechanism 112 according to the twelfth embodiment has a substantially similar configuration to that of the tenth embodiment, except that the shapes and arrangement of a holding portion 42, a support portion 43, and the sensor 15 are different. Therefore, in the twelfth embodiment, only the differences from the tenth embodiment will be described, and the rest will be omitted.

As shown in FIGS. 16(A) to 16(C), the rotation operation detection mechanism 112 includes the holding portion 42 having a columnar shape. The holding portion 42 is arranged on the back side 16 of the operation surface 11 of the operation unit 12. The one end 30 of the holding portion 42 is connected to the back side 16 of the operation unit 12. The other end 33 of the holding portion 42 is connected to the supporting portion 43. Note that the holding portion 42 is not limited to a columnar shape, and may be, for example, a polygonal columnar shape.

The support portion 43 is disposed so as to completely cover a position corresponding to the operation unit 12. In this manner, the holding portion 42 is more firmly fixed to the housing 10.

The sensor 15 is disposed on a side surface of the holding portion 42 along the circumferential direction of the operation unit 12. The sensor 15 is adhered so as to cover the entire side surface of the holding portion 42. In this manner, the sensor 15 can detect the deformation of the holding portion 42 completely. Further, an entire area of the sensor 15 becomes large, and an output of the entire sensor 15 becomes large.

Note that the sensor 15 may be disposed in part of the holding portion 42. For example, the sensor 15 may be disposed in an upper semicircular portion in a cross section of the holding portion 42. Further, the sensor 15 may be adhered so as to cover part of the side surface of the holding portion 42 in the Y direction.

The sensor 15 is adhered to the holding portion 42 so that the uniaxial stretching direction (arrow 901) is parallel to the Y direction. Note that the sensor 15 may adhered to the holding portion 42 so that the uniaxial stretching direction (arrow 901) is along the circumferential direction of the holding portion 42.

Figure 17A:
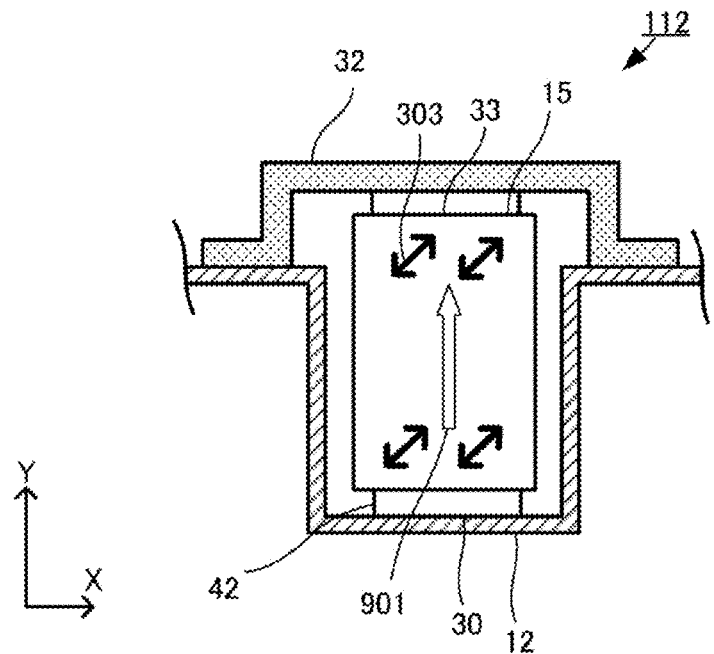
FIG. 17(A) and FIG. 17(B) are diagrams schematically showing a shear stress generated in a case where the user operates the rotation operation detection mechanism according to the twelfth embodiment.
Figure 17B:
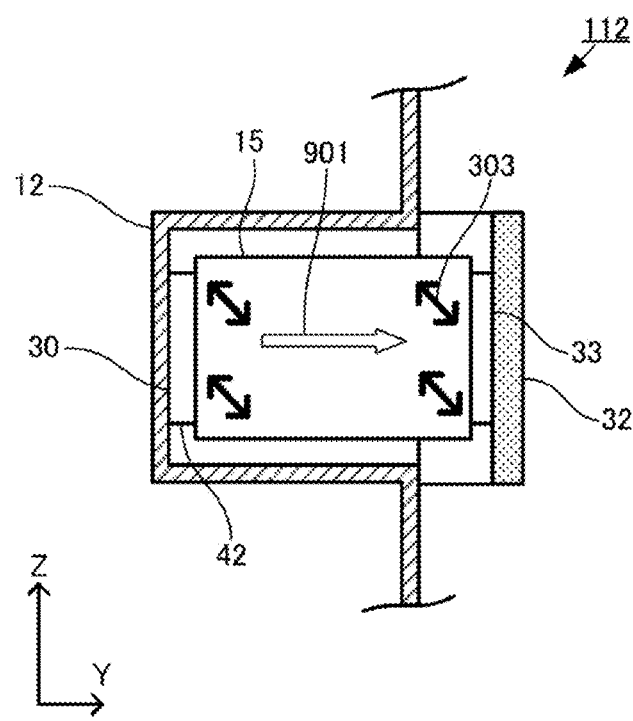

FIGS. 17(A) and 17(B) are diagrams schematically showing a shear stress generated when the user operates the rotation operation detection mechanism 112. FIG. 17(A) is a diagram when viewed from the positive side in the Z direction. FIG. 17(B) is a diagram when viewed from the positive side in the X direction.

When the user grips the operation unit 12 and applies a force in the direction in which the operation unit 12 rotates in the X-Z plane, the deformation of the operation unit 12 is transmitted from the one end 30 and the other end 33 of the holding portion 42 to the holding portion 42. As shown in FIGS. 17(A) and 17(B), a shear stress indicated by arrow 303 is generated in the holding portion 42.

The shear stress mainly forms a direction of 45 degrees with respect to the longitudinal direction (Y direction) of the holding portion 42. In this manner, a shear stress is generated in the sensor 15 as in the case of the rotation operation detection mechanism 110. Therefore, the rotation operation detection mechanism 112 can detect the rotation of the operation unit 12. In this case, the rotation direction of the operation unit 12 coincides with the rotation direction due to twisting of the holding portion 42 that generates a shear stress as indicated by arrow 303. Therefore, the sensor 15 can detect the rotation of the operation unit 12 with higher accuracy.

Hereinafter, a rotation operation detection mechanism 113 according to a thirteenth embodiment will be described.

Figure 18A:
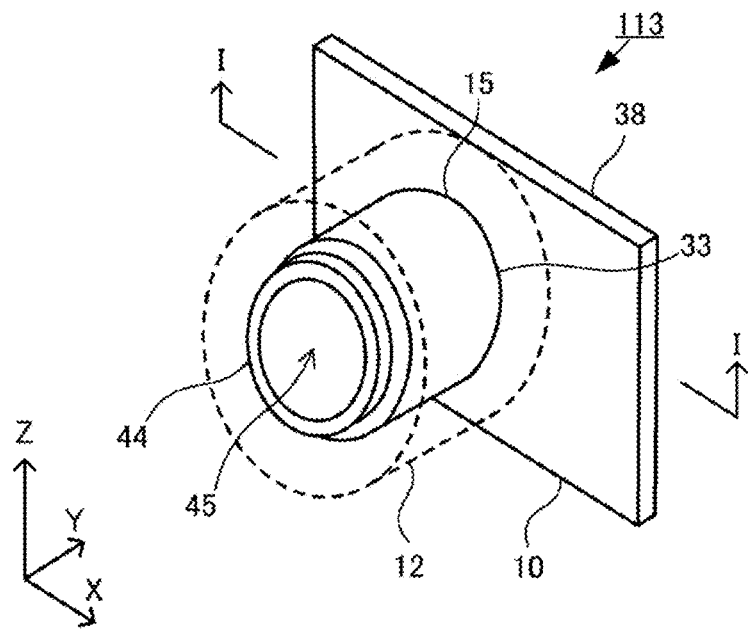
FIGS. 18(A) to 18(C) are diagrams for explaining the rotation operation detection mechanism according to a thirteenth embodiment.
Figure 18B:
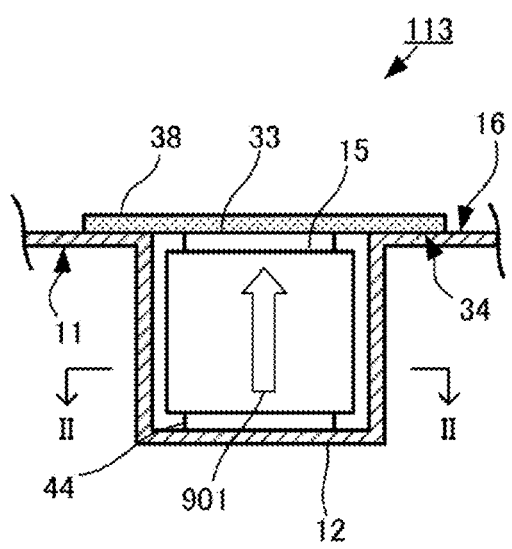
Figure 18C:
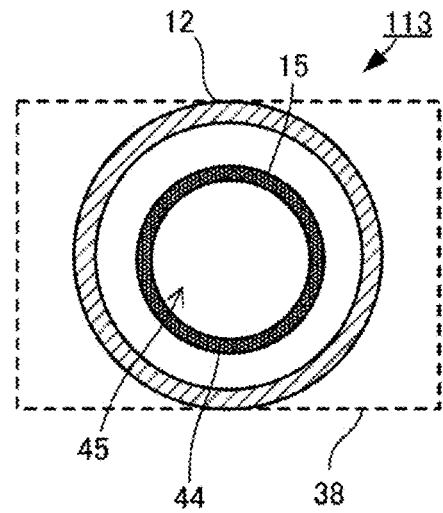

FIG. 18(A) is a perspective view of the rotation operation detection mechanism 113 according to the thirteenth embodiment. FIG. 18(B) is a partial cross-sectional view when the rotation operation detection mechanism 113 is cut along I-I in FIG. 18(A). FIG. 18(C) is a cross-sectional view when the rotation operation detection mechanism 113 is cut along II-II in FIG. 16(B). FIGS. 18(A) to 18(C) show only a portion around the operation unit 12 of the rotation operation detection mechanism 113. FIG. 18(A) shows the operation unit 12 by a broken line as transparent. The cut surface of FIG. 18(B) is further in the positive side of the Z direction than the sensor 15. That is, FIG. 18(B) shows only the operation unit 12 and a support portion 38 in a cross-sectional view, and is a diagram as viewed from the positive side to the negative side in the Z direction.

The rotation operation detection mechanism 113 according to the thirteenth embodiment has a substantially similar configuration to that of the twelfth embodiment, except that the shapes of a holding portion 44 and the support portion 38. Therefore, in the thirteenth embodiment, only the differences from the twelfth embodiment will be described, and the rest will be omitted.

As shown in FIGS. 18(A) to 18(C), the rotation operation detection mechanism 113 includes the holding portion 44 having a cylindrical shape. The holding portion 44 is hollow and has an internal space 45. Since the holding portion 44 has the internal space 45, the rigidity is low. The holding portion 44 is easily deformed by an external force. For this reason, a shearing force generated on a side surface of the holding portion 44 is large as compared with a case where the holding portion 44 is not hollow. Therefore, when the user grips the operation unit 12 and applies a force in the direction in which the operation unit 12 rotates in the X-Z plane, the output of the sensor 15 is large as compared to a case where the holding portion 44 is not hollow.

The support portion 38 has a flat plate shape not protruding from the operation surface 11 into the housing 10. For this reason, formation of the support portion 38 is easy.

Hereinafter, a rotation operation detection mechanism 114 according to a fourteenth embodiment will be described.

Figure 19A:
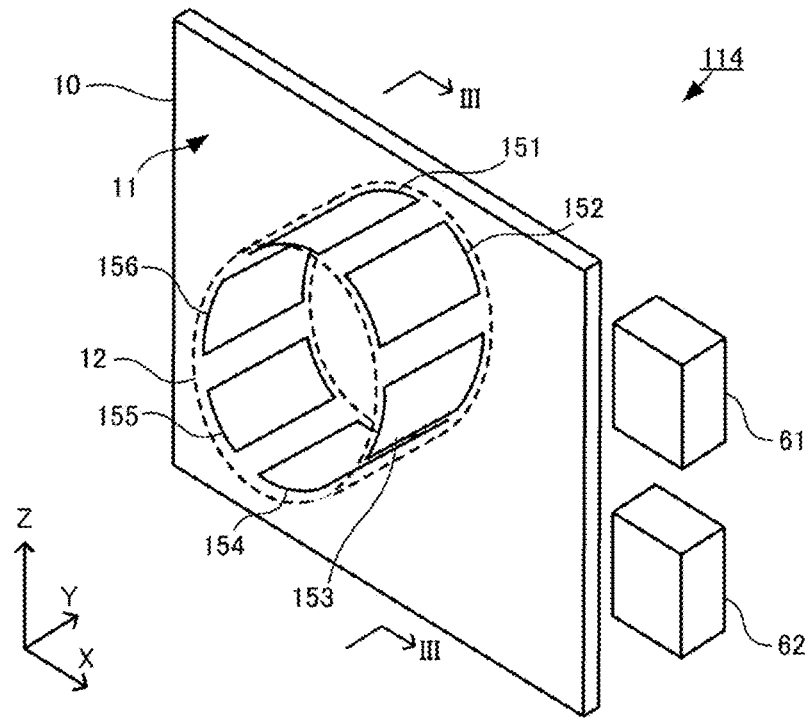
FIGS. 19(A) to 19(C) are diagrams for explaining the rotation operation detection mechanism according to a fourteenth embodiment.
Figure 19B:
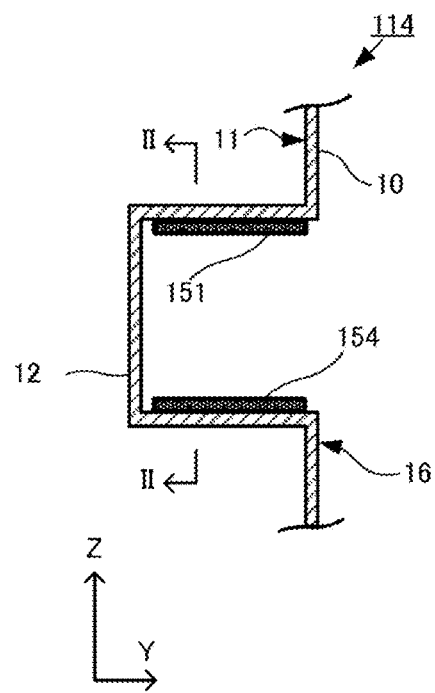
Figure 19C:
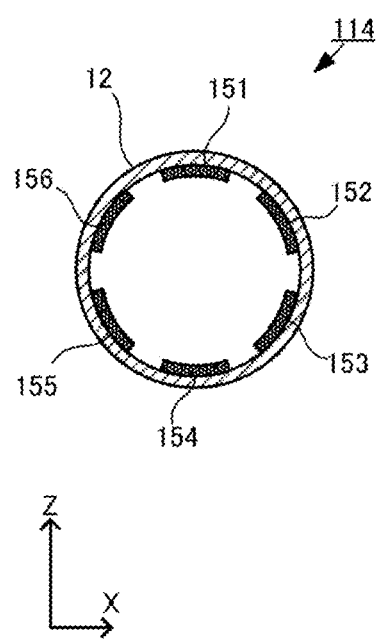

FIG. 19(A) is a perspective view of the rotation operation detection mechanism 114 according to the fourteenth embodiment. FIG. 19(B) is a cross-sectional view when the rotation operation detection mechanism 114 is cut along in FIG. 19(A). FIG. 19(C) is a cross-sectional view when the rotation operation detection mechanism 114 is cut along II-II in FIG. 19(B). FIGS. 19(A) to 19(C) show only a portion around the operation unit 12 of the rotation operation detection mechanism 114. FIG. 19(A) shows the operation unit 12 by a broken line as transparent, and shows only part of the housing 10.

The rotation operation detection mechanism 114 according to the fourteenth embodiment has a substantially similar configuration to the first embodiment except that the rotation operation detection mechanism 114 includes a plurality of sensors 151 to 156. Therefore, in the fourteenth embodiment, only the differences from the first embodiment will be described, and the rest will be omitted.

As shown in FIGS. 19(A) to 19(C), the rotation operation detection mechanism 114 includes six of the sensors 151 to 156, a signal processing unit 61, and a signal detection unit 62. The signal processing unit 61 and the signal detection unit 62 are disposed inside the housing 10.

As shown, the sensors 151 to 156 are disposed on the back surface 16 of the operation surface 11 on the side surface of the operation unit 12. The sensors 151 to 156 are disposed at regular intervals along the circumferential direction of the operation unit 12. Six of the sensors 151 to 156 are disposed, one for each of sections obtained by dividing the side surface of the operation unit 12 into six equal parts. It is noted that the phrase "six equal parts" indicates a state in which the operation unit 12 is equally divided in the circumferential direction at a central angle of 60°. That is, the sensors are disposed in each of the sections obtained by equally dividing the side surface of the operation unit 12. It is also noted that the number of the sensors is not limited to six as long as the number is three or more. Further, the sensors only need to be disposed in each of the sections into which the operation unit 12 is equally divided, and the intervals between the sensors do not need to be equal. Furthermore, the equal division may include an error to some extent, and may include an error of, for example, about 10°.

Figure 20:
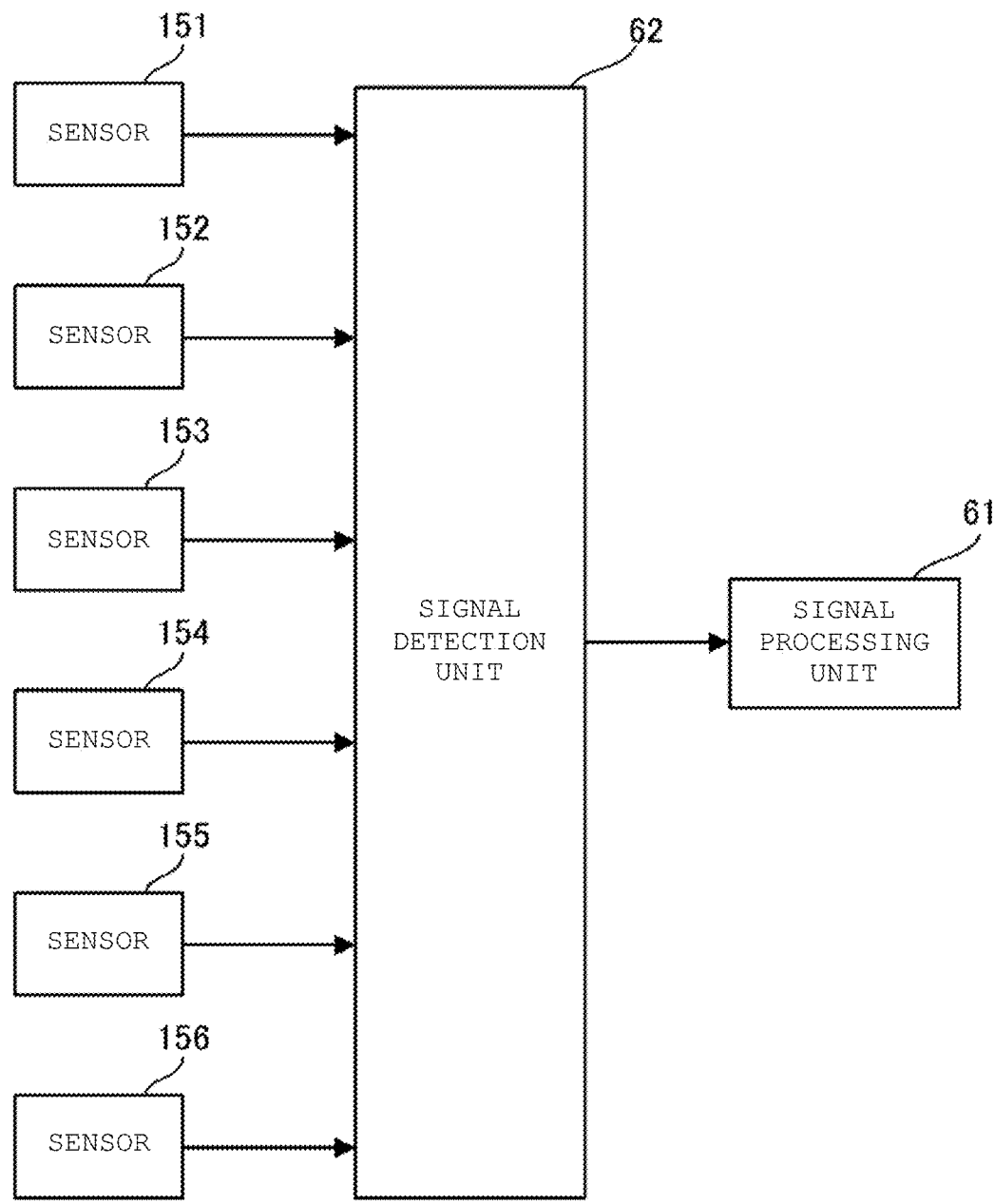
FIG. 20 is a functional block diagram of signal processing performed by the sensor, a sensor detection circuit, and a microcomputer of the rotation operation detection mechanism according to the fourteenth embodiment.

FIG. 20 is a functional block diagram of signal processing performed by six of the sensors 151 to 156 of the rotation operation detection mechanism 114, the signal detection unit 62, and the signal processing unit 61. The sensors 151 to 156 are connected to the signal detection unit 62.

When the user deforms the operation unit 12, the sensors 151 to 156 corresponding to the deformed locations of the operation unit 12 generate charge. The signal detection unit 62 detects charge generated in the sensors 151 to 156. The signal processing unit 61 inputs a detection value of the signal detection unit 62. The signal processing unit 61 detects a voltage value detected by the signal detection unit 62 for each of the sensors 151 to 156. That is, the signal processing unit 61 detects the magnitude of deformation of the operation unit 12 at a position corresponding to each of the sensors 151 to 156 as a load applied to the operation unit 12 by the user.

The signal processing unit 61 includes a storage unit (not shown), and stores a predetermined threshold set in advance. The threshold is set in each of the positive and negative polar directions. The signal processing unit 61 detects, as a peak, a voltage value output from the sensors 151 to 156 whose peak is equal to or more than the predetermined threshold. Further, the signal processing unit 61 does not detect, as a peak, a voltage value output from the sensors 151 to 156 whose peak is less than the predetermined threshold. In this manner, the signal processing unit 61 can suppress unnecessary processing for noise and the like.

The signal processing unit 61 stores a time at which the signal detection unit 62 detects a peak of a voltage value. In this manner, the signal processing unit 61 can store from which sensor a signal is generated at which time associated with each other. Therefore, the signal processing unit 61 can determine the order in which signals are generated for each sensor. Hereinafter, detection values from the sensors 151 to 156 when the user operates the operation unit 12 will be described.

Figure 21:
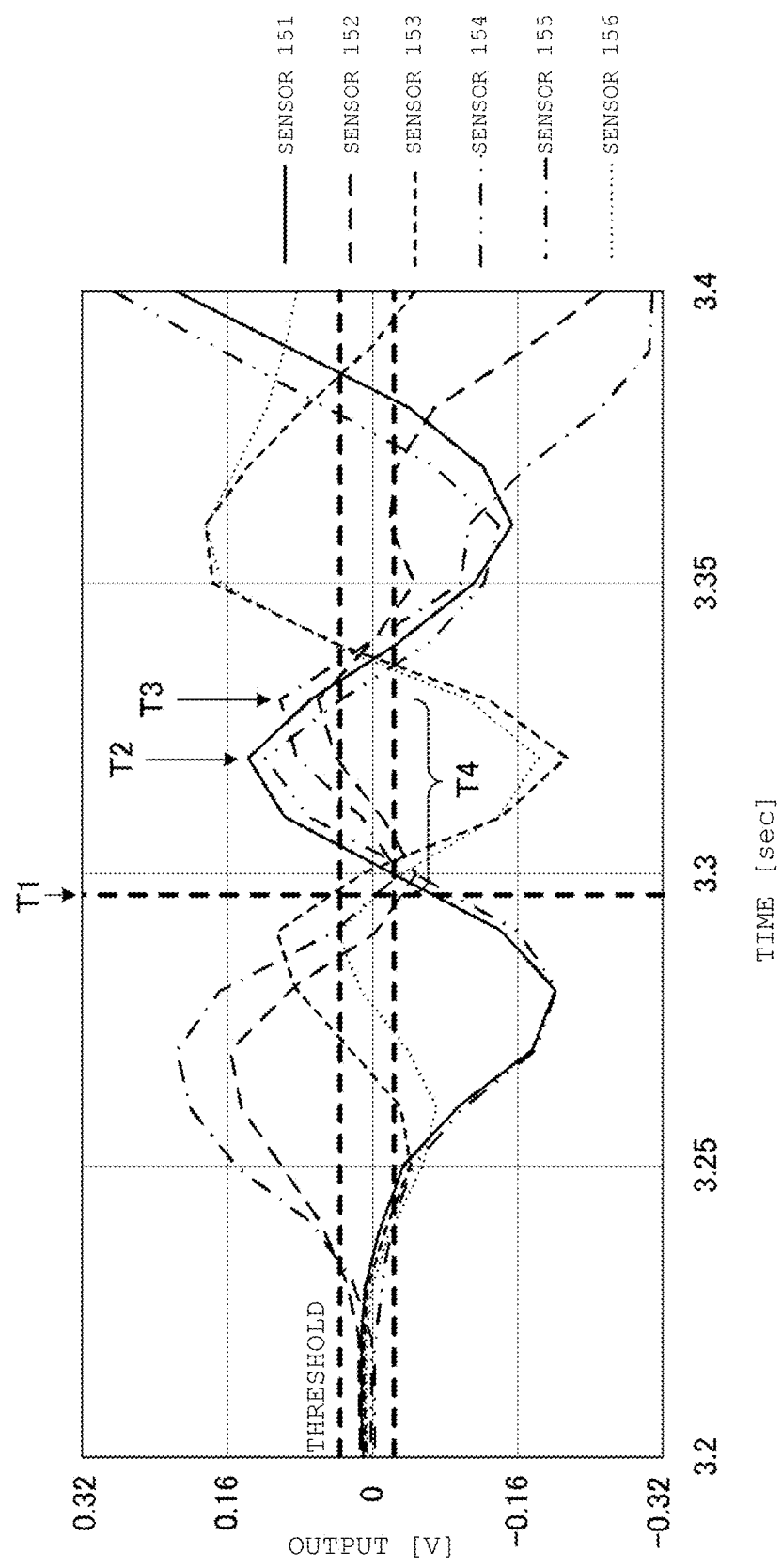
FIG. 21 is a graph showing a detection value of the sensor in a case where the user rotates the operation unit of the rotation operation detection mechanism according to the fourteenth embodiment to the right.

FIG. 21 is a graph showing detection values of the sensors 151 to 156 when the user rotates the operation unit 12 of the rotation operation detection mechanism 114 clockwise to the right.

Figure 22:
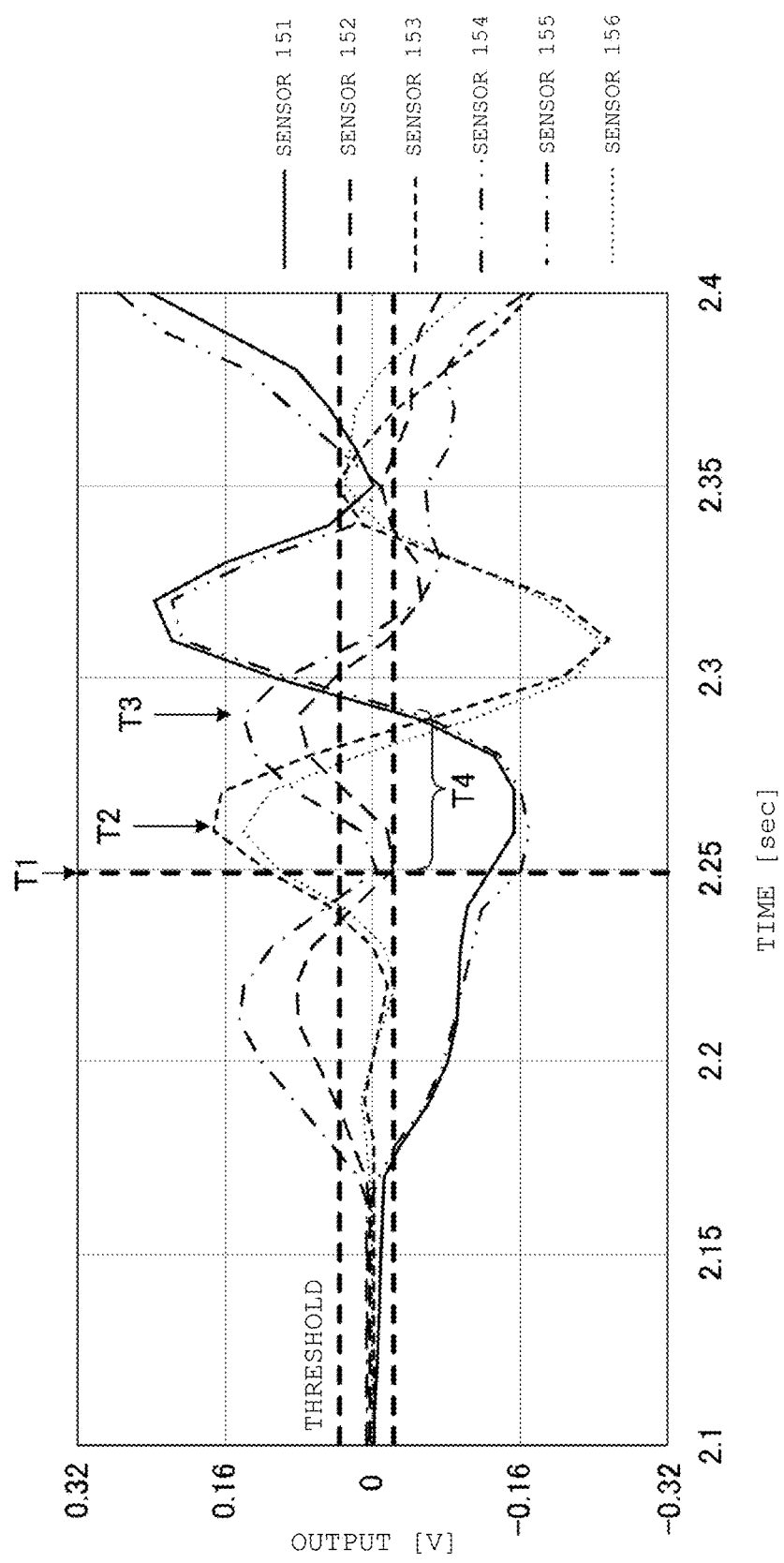
FIG. 22 is a graph showing a detection value of the sensor in a case where the user rotates the operation unit of the rotation operation detection mechanism according to the fourteenth embodiment to the left.

FIG. 22 is a graph showing detection values of the sensors 151 to 156 when the user rotates the operation unit 12 of the rotation operation detection mechanism 114 counterclockwise to the left.

Figure 23:
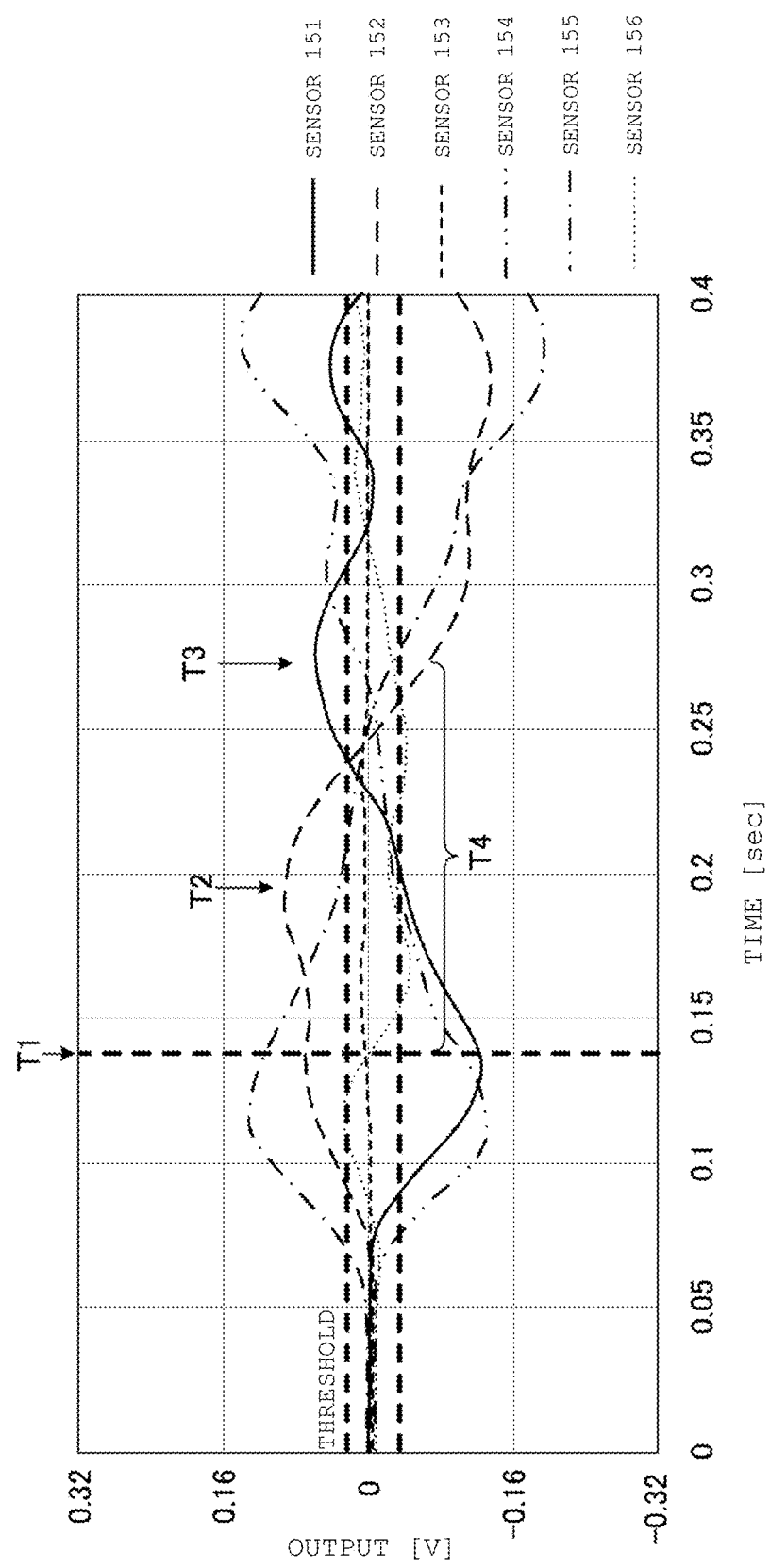
FIG. 23 is a graph showing a detection value of the sensor in a case where the user grips the operation unit of the rotation operation detection mechanism according to the fourteenth embodiment.

FIG. 23 is a graph showing detection values of the sensors 151 to 156 when the user only grips the operation unit 12 of the rotation operation detection mechanism 114. Note that FIGS. 21 to 23 show examples of detection values.

Hereinafter, detection values from the sensors 151 to 156 when the user rotates the operation unit 12 to the right, rotates the operation unit 12 to the left, and only grips the operation unit 12 will be described in order.

When the user rotates the operation unit 12 to the right, the signal processing unit 61 first detects peaks of positive voltage values from the sensors 152 and 155 as shown in FIG. 21. Note that the signal processing unit 61 detects only a peak that exceeds a predetermined threshold in both positive and negative sides as a peak. A time at which a voltage value detected from the sensor 152 or the sensor 155 first returns to 0 V, which is a reference value, is defined as a first time (T1).

In this case, a time at which a voltage value detected from the sensor 155 returns to 0 V is the first time (T1). The signal processing unit 61 stores the first time (T1).

The signal processing unit 61 treats a signal detected by the signal detection unit 62 after the first time (T1) as the basis for determination. That is, the signal processing unit 61 treats a time before the first time (T1) as the influence of the user gripping the operation unit 12 and excluding the time from the basis for determination. In this manner, erroneous determination due to the influence of the user gripping the operation unit 12 can be prevented.

At and after the first time (T1), the signal processing unit 61 detects a peak of a first positive voltage value from the sensor 151 and the sensor 154, and then detects a peak of a second positive voltage value from the sensor 152 and the sensor 155. The signal processing unit 61 stores a time at which the peak of the first positive voltage value is detected from the sensors 151 and 154 as a second time (T2). The signal processing unit 61 stores a time at which the peak of the second positive voltage value is detected from the sensors 152 and 155 as a third time (T3). During a period (T4 shown in FIG. 21) from the first time (T1) to the third time (T3), the signal processing unit 61 detects that a voltage value generated from the sensors 153 and 156 exceeds the threshold.

At and after the first time (T1), the signal processing unit 61 determines that the order of detecting the peaks of the positive voltage values is the order from the sensors 151 and 154 to the sensors 152 and 155. In other words, the order of detecting the peaks of the positive voltage values is the order from the sensor 151 to the sensor 152 adjacent to the sensor 151, and from the sensor 154 to the sensor 155 adjacent to the sensor 154. The order of detecting the peaks of the positive voltage values is clockwise when the operation unit 12 is viewed from the front.

Further, the signal processing unit 61 detects a peak from the sensor 151, the sensor 152, the sensor 154, and the sensor 155 during the period from the first time (T1) to the third time (T3), and detects that the voltage values generated from the sensor 153 and the sensor 156 exceed the threshold. In other words, the signal processing unit 61 determines that the voltage values generated from all the sensors 151 to 156 exceed the threshold during the period from the first time (T1) to the third time (T3). Therefore, the signal processing unit 61 determines that the user rotates the operation unit 12 to the right.

When the user rotates the operation unit 12 counterclockwise to the left, the signal processing unit 61 first detects peaks of positive voltage values from the sensors 152 and 155 as shown in FIG. 22. A time at which a voltage value detected from the sensor 152 or the sensor 155 first returns to 0 V, which is a reference value, is defined as a first time (T1). In this case, a time at which a voltage value detected from the sensor 155 returns to 0 V is the first time (T1).

At and after the first time (T1), the signal processing unit 61 detects a peak of a first positive voltage value from the sensor 153 and the sensor 156, and then detects a peak of a second positive voltage value from the sensor 152 and the sensor 155. The signal processing unit 61 stores a time at which the peak of the first positive voltage value is detected from the sensors 153 and 156 as the second time (T2). The signal processing unit 61 stores a time at which the peak of the second positive voltage value is detected from the sensors 152 and 155 as a third time (T3). During the period (T4 shown in FIG. 22) from the first time (T1) to the third time (T3), the signal processing unit 61 detects that a voltage value generated from the sensors 151 and 154 exceeds the threshold.

At and after the first time (T1), the signal processing unit 61 determines that the order of detecting the peaks of the positive voltage values is the order from the sensors 153 and 156 to the sensors 152 and 155. In other words, the order of detecting the peaks of the positive voltage values is the order from the sensor 153 to the sensor 152 adjacent to the sensor 153, and from the sensor 156 to the sensor 155 adjacent to the sensor 156. The order of detecting the peaks of the positive voltage values is counterclockwise when the operation unit 12 is viewed from the front.

Further, the signal processing unit 61 detects a peak from the sensor 152, the sensor 153, the sensor 155, and the sensor 156 during the period from the first time (T1) to the third time (T3), and detects that the voltage values generated from the sensor 151 and the sensor 154 exceed the threshold. In other words, the signal processing unit 61 determines that the voltage values generated from all the sensors 151 to 156 exceed the threshold during the period from the first time (T1) to the third time (T3). Therefore, the signal processing unit 61 determines that the user rotates the operation unit 12 to the left.

When the user only grips the operation unit 12, the signal processing unit 61 first detects peaks of positive voltage values from the sensors 155 and 156 as shown in FIG. 23. A time at which a voltage value detected from the sensor 155 or the sensor 156 first returns to 0 V, which is a reference value, is defined as the first time (T1). In this case, a time at which a voltage value detected from the sensor 156 returns to 0 V is the first time (T1).

At and after the first time (T1), the signal processing unit 61 detects a peak of a first positive voltage value from the sensor 152, and then detects a peak of a second positive voltage value from the sensor 151. The signal processing unit 61 stores a time at which the peak of the first positive voltage value is detected from the sensor 152 as the second time (T2). The signal processing unit 61 stores a time at which the peak of the second positive voltage value is detected from the sensor 151 as the third time (T3). During the period (T4 shown in FIG. 23) from the first time (T1) to the third time (T3), the signal processing unit 61 detects that a voltage value generated from the sensor 152 does not exceed the threshold.

In this manner, the signal processing unit 61 determines that all the voltage values generated from the sensors 151 to 156 do not exceed the threshold during the period from the first time (T1) to the third time (T3). Therefore, the signal processing unit 61 determines that the user only grips the operation unit 12 and there is no rotation operation.

As described above, the rotation operation detection mechanism 114 can determine that the user rotates or only grips the operation unit 12. Further, when determining that the user rotates the operation unit 12, the rotation operation detection mechanism 114 can determine whether a direction of the rotation is to the right or to the left.

Figure 24:
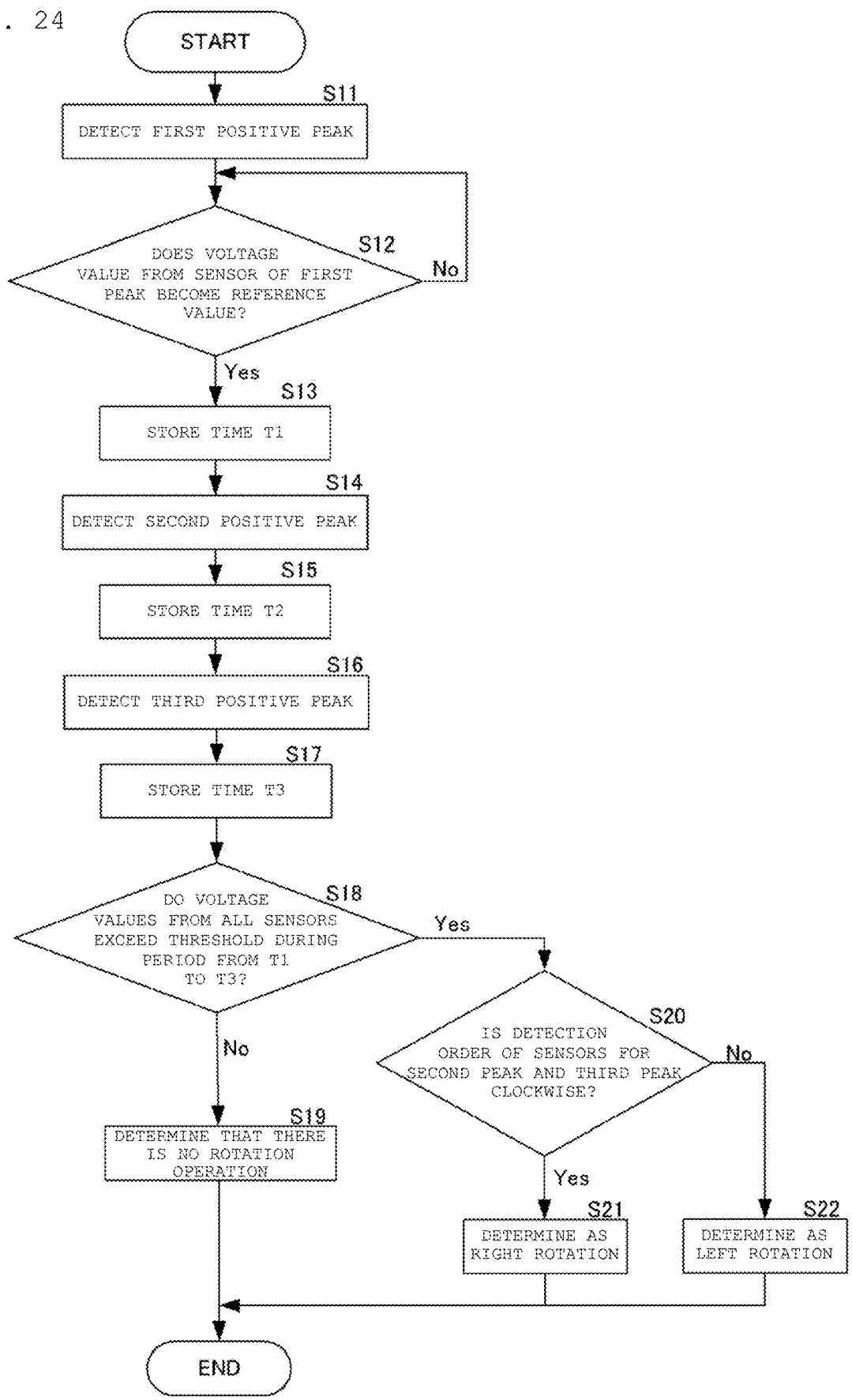
FIG. 24 is a flowchart showing a rotation operation detection method.

Hereinafter, a rotation operation detection method in the rotation operation detection mechanism 114 will be described. FIG. 24 is a flowchart showing the rotation operation detection method.

As shown in FIG. 24, when the user grips the operation unit 12 to rotate the unit 12, the signal processing unit 61 first detects a first peak of a positive voltage value from any one of the sensors 151 to 156 (S11). The signal processing unit 61 determines whether or not a voltage value from the sensor that detects the first peak has first reached 0 V, which is the reference value (S12). When the signal processing unit 61 determines that the voltage value from the sensor that detects the first peak has first reached 0 V, which is the reference value (S12: Yes), a time at which the voltage values becomes 0 V is stored as the first time (T1) (S13). When the signal processing unit 61 determines that the voltage value from the sensor that detects the first peak has not reached 0 V, which is the reference value, first (S12: No), the signal processing unit 61 continues the detection until the voltage value from the sensor that detects the first peak first reaches 0 V, which is the reference value.

At and after the first time (T1), the signal processing unit 61 detects a second peak of a second positive voltage value (S14). The signal processing unit 61 stores a time at which the second peak is detected as the second time (T2) (S15). At and after the second time (T2), the signal processing unit 61 detects a third peak of a third positive voltage value (S16).

The signal processing unit 61 stores a time at which the third peak is detected as the third time (T3) (S17).

The signal processing unit 61 determines whether or not voltage values from all the sensors exceed the threshold during the period from the first time (T1) to the third time (T3) (S18). When the signal processing unit 61 determines that the voltage values from all the sensors do not exceed the threshold during the period from the first time (T1) to the third time (T3) (S18: No), it is determined that the user only grips the operation unit 12 and that there is no rotation operation (S19).

When the signal processing unit 61 determines that the voltage values from all the sensors exceed the threshold during the period from the first time (T1) and the third time (T3) (S18: Yes), whether or not the detection order of the sensors that detect the second peak and the third peak is clockwise in the operation unit 12 (S20). When determining that the detection order of the sensors that detect the second peak and the third peak is clockwise in the operation unit 12 (S20: Yes), the signal processing unit 61 determines that the user rotates the operation unit 12 to the right (S21). When determining that the detection order of the sensors that detect the second peak and the third peak is not clockwise in the operation unit 12 (S20: No), the signal processing unit 61 determines that the user rotates the operation unit 12 to the left (S22).

As described above, the rotation operation detection method can determine that the user rotates or only grips the operation unit 12. Further, when determining that the user rotates the operation unit 12, the rotation operation detection method can determine whether a direction of the rotation is to the right or to the left.

It is also noted that, in each of the exemplary embodiments, the housings 10 and 50 are formed in a rectangular parallelepiped. However, the configuration is not limited to the above, and the housings 10 and 50 may be formed in a disc shape, a spherical shape, a polygonal column shape, or the like, in alternative embodiments.

It is further noted that the rotation operation detection mechanism in each of the embodiments can be applied to various ones. For example, the mechanism can be applied to an operation panel of electric appliances, such as a washing machine, a microwave oven, a fan, a refrigerator, an air conditioner, a telephone, a personal computer, a mouse, and a clock, household appliances, such as a plug of a faucet of a sink, a door knob, a window sash, and an environment setting panel of a bathroom, evaluation facilities, such as an oscilloscope, a tester, and a stabilized power supply, a power button installed outdoors, and the like.

DESCRIPTION OF REFERENCE SYMBOLS

1: Main surface (first main surface)
10, 50: Housing
11: Operation surface
12, 13, 14, 17, 18, 19: Operation unit
15, 81, 82, 83, 84, 90: Sensor
16: Back side
20: Piezoelectric film
21: First electrode
22: Second electrode
31, 41, 42, 44: Holding portion
32, 38, 43: Support portion
51: Short side
52: Long side
61: Signal processing unit
62: Signal detection unit
71: Boundary
101, 102, 103, 104, 105, 106, 107, 108, 109, 110, 111, 112, 113, 114: Rotation operation detection mechanism
121: End portion
151, 152, 153, 154, 155, 156: Sensor
191: Boundary

The invention claimed is:

1. A rotation operation detection mechanism comprising:
a housing;
an operation surface disposed on a first main surface of the housing;
an operation unit formed integrally and continuously with the housing and protruding from the operation surface, with the operation unit configured to rotate about a rotational axis that is orthogonal to the operation surface; and
a sensor disposed directly on a back surface of the operation unit,
wherein the sensor is planar shaped and is configured to detect a stress generated on the housing when the operation unit is rotated.

2. The rotation operation detection mechanism according to claim 1, wherein the sensor is disposed on a back surface of the operation surface.

3. The rotation operation detection mechanism according to claim 1, wherein the operation unit has one of a columnar or polygonal column shape.

4. The rotation operation detection mechanism according to claim 3, wherein the operation unit has a hollow shape.

5. The rotation operation detection mechanism according to claim 4, wherein the sensor is disposed along a circumferential direction of the operation unit.

6. The rotation operation detection mechanism according to claim 5, wherein the sensor is disposed along a side surface of the operation unit.

7. The rotation operation detection mechanism according to claim 1, wherein a portion of the operation unit protrudes on a back side of the operation surface.

8. The rotation operation detection mechanism according to claim 1, wherein the sensor is configured to detect a rotation direction that matches a shear stress applied to the operation surface when the operation unit is rotated.

9. The rotation operation detection mechanism according to claim 1, wherein the sensor is disposed on a location other than the operation unit on the operation surface, such that the sensor is disposed along a direction parallel or orthogonal to a tangential direction in a circumferential direction of the operation unit.

10. The rotation operation detection mechanism according to claim 1, further comprising a plurality of the sensors configured to detect the stress generated on the housing when the operation unit is rotated, with the plurality of sensors being disposed annularly around the operation unit.

11. The rotation operation detection mechanism according to claim 1, wherein the sensor extends across a boundary between the operation unit and the housing other than the operation unit.

12. The rotation operation detection mechanism according to claim 1,
wherein the sensor includes a piezoelectric film including a chiral polymer stretched in a predetermined direction, and
wherein the piezoelectric film comprises a rectangular shape and a stretching direction that extends along a short side direction or a long side direction of the piezoelectric film.

13. The rotation operation detection mechanism according to claim 1, further comprising a holding portion disposed on a back side of the operation surface in the operation unit, with the sensor being disposed on the holding portion, and wherein the holding portion has a flat plate or columnar shape.

14. A rotation operation detection mechanism comprising;
a housing;
an operation surface disposed on a first main surface of the housing;
an operation unit formed integrally with the housing and protruding from the operation surface, with the operation unit configured to rotate about a rotational axis that is orthogonal to the operation surface; and
a plurality of sensors disposed in the operation unit divided into three or more sections and that are directly coupled on a back side of the operation surface on a side surface thereof.

15. The rotation operation detection mechanism according to claim 14, further comprising:
a signal detection unit configured to detect a signal output by each sensor of the plurality of sensors; and
a signal processing unit configured to receive an input signal from the respective signals detected by the signal detection unit.

16. The rotation operation detection mechanism according to claim 14, wherein the side surface extends in a direction parallel to the rotational axis of the operation unit.

17. A rotation operation detection mechanism comprising:
a housing;
an operation surface disposed on a first main surface of the housing;
an operation unit formed integrally with the housing and protruding from the operation surface;
a plurality of sensors in the operation unit divided into three or more sections on a back side of the operation surface on a side surface thereof;
a signal detection unit configured to detect a signal output by each sensor of the plurality of sensors; and
a signal processing unit is configured to:
receive an input signal from the respective signals detected by the signal detection unit;
determine that one sensor of the plurality of sensors outputs a signal with a peak having an intensity equal to or more than a predetermined threshold for a predetermined first time;
store a time at which the respective signal is determined to become a reference value as a first time; and
handle a signal detected by the signal detection unit after the first time for determining a detection of rotation operation.

18. The rotation operation detection mechanism according to claim 17, wherein the signal processing unit is configured to:
store, as a second time, a time at which one sensor of the plurality of sensors outputs a signal with a peak having an intensity equal to or more than the predetermined threshold for a subsequent time after the first time;
store, as a third time, a time at which one sensor of the plurality of sensors outputs a signal with a peak having an intensity equal to or more than the predetermined threshold and of a same polarity as a peak output at the second time for a subsequent time after the second time; and
determine that the operation unit receives a rotation operation when signals of all sensors of the plurality of sensors are determined to exceed the predetermined threshold during a period from the first time to the third time.

19. The rotation operation detection mechanism according to claim 18, wherein the signal processing unit is configured to determine a rotation direction of the operation unit based on a detection order of peaks of one sensor of the plurality of sensors that outputs a signal with a peak at the second time and one sensor of the plurality of sensors that outputs a signal with a peak at the third time.

20. The rotation operation detection mechanism according to claim 17, wherein the signal processing unit is configured to:
store, as a second time, a time at which one of the plurality of sensors outputs a signal with a peak having an intensity equal to or more than the predetermined threshold for subsequent time after the first time;
store, as a third time, a time at which one sensor of the plurality of sensors outputs a signal with a peak having an intensity equal to or more than the predetermined threshold and of same polarity as a peak output at the second time for subsequent time after the second time; and
determine that the operation unit receives only a gripping operation when signals of all of the plurality of sensors do not exceed the predetermined threshold during a period from the first time to the third time.

* * * * *